United States Patent
Priness et al.

(10) Patent No.: US 9,872,150 B2
(45) Date of Patent: Jan. 16, 2018

(54) INFERRING LOGICAL USER LOCATIONS

(71) Applicant: Microsoft Technology Licensing, LLC, Redmond, WA (US)

(72) Inventors: Ido Priness, Herzliya (IL); Shira Weinberg, Tel Aviv (IL); Dikla Dotan-Cohen, Herzliya (IL); Assaf Avihoo, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/008,158

(22) Filed: Jan. 27, 2016

(65) Prior Publication Data

US 2017/0034666 A1    Feb. 2, 2017

Related U.S. Application Data

(60) Provisional application No. 62/198,119, filed on Jul. 28, 2015.

(51) Int. Cl.
| | |
|---|---|
| *H04M 1/56* | (2006.01) |
| *H04M 15/06* | (2006.01) |
| *H04W 4/04* | (2009.01) |
| *H04W 64/00* | (2009.01) |
| *G06Q 30/00* | (2012.01) |

(52) U.S. Cl.
CPC ............. *H04W 4/04* (2013.01); *G06Q 30/00* (2013.01); *H04W 64/00* (2013.01)

(58) Field of Classification Search
CPC ........ H04M 1/006; H04W 4/04; H04W 64/04
USPC ................ 455/456.1; 379/93.07, 142.01
See application file for complete search history.

(56) References Cited

U.S. PATENT DOCUMENTS

| | | | | |
|---|---|---|---|---|
| 5,375,161 A | * | 12/1994 | Fuller | H04M 1/006 379/142.01 |
| 7,882,056 B2 | | 2/2011 | Begole et al. | |
| 8,095,882 B2 | * | 1/2012 | Kashi | G06F 9/543 379/93.07 |

(Continued)

OTHER PUBLICATIONS

"International Search Report and Written Opinion Issued in PCT Application No. PCT/US2016/043451", dated Sep. 21, 2016, 11 Pages.

(Continued)

*Primary Examiner* — William D Cumming
(74) *Attorney, Agent, or Firm* — Shook, Hardy & Bacon L.L.P.

(57) ABSTRACT

A logical location of a user may be inferred using semantics of the user's computing device(s). The logical locations may correspond to venues visited by the user, such as frequently visited venues, referred to as hubs. Logical hubs, representing logical locations, may be tagged to the computing device by classifying the device as being associated with a logical hub. Classification may be based on signals or features of the device, such as device usage or device characteristics. The device may be monitored to detect user activity. Based on analysis of the user activity and associated logical hub, the user's logical location may be inferred. A computer user-experience may be personalized to the user based on the user's inferred logical location or logical hub(s) associated with the device. In some cases, geographical location information is not used to determine the logical hubs or infer a user's logical location.

20 Claims, 8 Drawing Sheets

(56) References Cited

U.S. PATENT DOCUMENTS

| | | |
|---|---|---|
| 8,321,527 B2 | 11/2012 | Martin et al. |
| 8,510,253 B2 | 8/2013 | Anderson et al. |
| 8,521,680 B2 | 8/2013 | Lin |
| 8,558,693 B2 | 10/2013 | Martin et al. |
| 8,620,993 B2 | 12/2013 | Kim et al. |
| 8,674,826 B2 | 3/2014 | Becker et al. |
| 2006/0284979 A1 | 12/2006 | Clarkson |
| 2008/0248809 A1 | 10/2008 | Gower |
| 2013/0124315 A1 | 5/2013 | Doughty et al. |
| 2013/0204813 A1* | 8/2013 | Master ................ G06N 99/005 706/12 |
| 2013/0226856 A1 | 8/2013 | Zhang et al. |
| 2013/0318584 A1 | 11/2013 | Narayanan et al. |
| 2014/0232569 A1 | 8/2014 | Skinder et al. |
| 2014/0232570 A1 | 8/2014 | Skinder et al. |
| 2015/0095333 A1 | 4/2015 | Porpora et al. |
| 2015/0105096 A1 | 4/2015 | Chowdhury et al. |
| 2017/0116285 A1* | 4/2017 | Dotan-Cohen ... G06F 17/30528 |

OTHER PUBLICATIONS

"Second Written Opinion Issued in PCT Application No. PCT/US2016/043451", dated Jul. 12, 2017, 7 Pages.

"International Preliminary Report on Patentability Issued in PCT Application No. PCT/US2016/043451", dated Oct. 17, 2017, 8 Pages.

\* cited by examiner

INFERRING LOGICAL USER LOCATIONS

CROSS-REFERENCE TO RELATED APPLICATIONS

This application claims the benefit of U.S. Provisional Application No. 62/198,119, titled "Inferring Logical User Locations," filed Jul. 28, 2015, which is hereby expressly incorporated by reference in its entirety.

BACKGROUND

Computerized personal-assistant applications and services can provide user experiences that are personalized to a user based on locations frequently visited by the user. These experiences may be made available via mobile devices, such as smart phones, because these devices are capable of providing accurate location information for the user. For example, if the GPS sensor of a user's smart phone detects that the user is at a location associated with the user's home, then a personal assistant application may withhold work-related notifications from the user's computing devices until the GPS sensor detects that the user is at a location corresponding to the user's place of work.

However, sometimes accurate location information for the user is not available, such as for static computing devices like desktop computers, other user devices lacking location-detection functionality, like wearable fitness devices, or user devices having the location detection functionality disabled. For example, sometimes users choose to disable GPS component on their mobile devices in order to reduce battery consumption, thereby preventing accurate determination of their location. Typically under such circumstances, the computer system refrains from providing the personalized user experiences.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described in the present disclosure are directed towards inferring logical locations of a user based on semantics of a user's computing device. The logical locations may correspond to one or more venues visited by a user, such as frequently visited venues, referred herein to as "hubs." In particular, a user's computing device (a "user device") may be associated with a logical hub based on one or more signals or features of the user device, such as device usage or device characteristics.

As will be further described, various features of a user device may be sensed or otherwise detected, analyzed, and used for classifying the user device as being associated with a particular logical hub. In some embodiments, the logical hubs do not require a corresponding physical location, nor do the processes disclosed herein for determining logical hubs (or inferring the logical location of a user) require using location information. Rather, the logical hub(s) may be determined using other features of the device, as further described below.

Upon detecting user activity on the user device, a logical location of the user may be inferred based in part on the logical hub(s) determined to correspond to that particular user device. For example, using characteristics of a user device, user interactions with the device, or other identified features, the computer system may infer that a particular user is logically at her office hub or her home hub. The inferred logical location of the user may be provided to a computerized personal assistant application or otherwise consumed by an application or service on the computer system. Based on the inferred logical location of the user, the computer system may personalize the user experience, such as by modifying the delivery or presentation of certain communications, reminders, or other notifications, or by providing or tailoring certain applications, services, or other content, for example. In this way, where it is desired or where accurate location information for a user is unavailable from a user device, embodiments of the disclosure may provide a logical location of a user based on logical hubs associated with the user device, thereby enabling a personalized user experience to be provided.

BRIEF DESCRIPTION OF THE DRAWINGS

Aspects of the disclosure are described in detail below with reference to the attached drawing figures, wherein.

DETAILED DESCRIPTION

Figure 1:
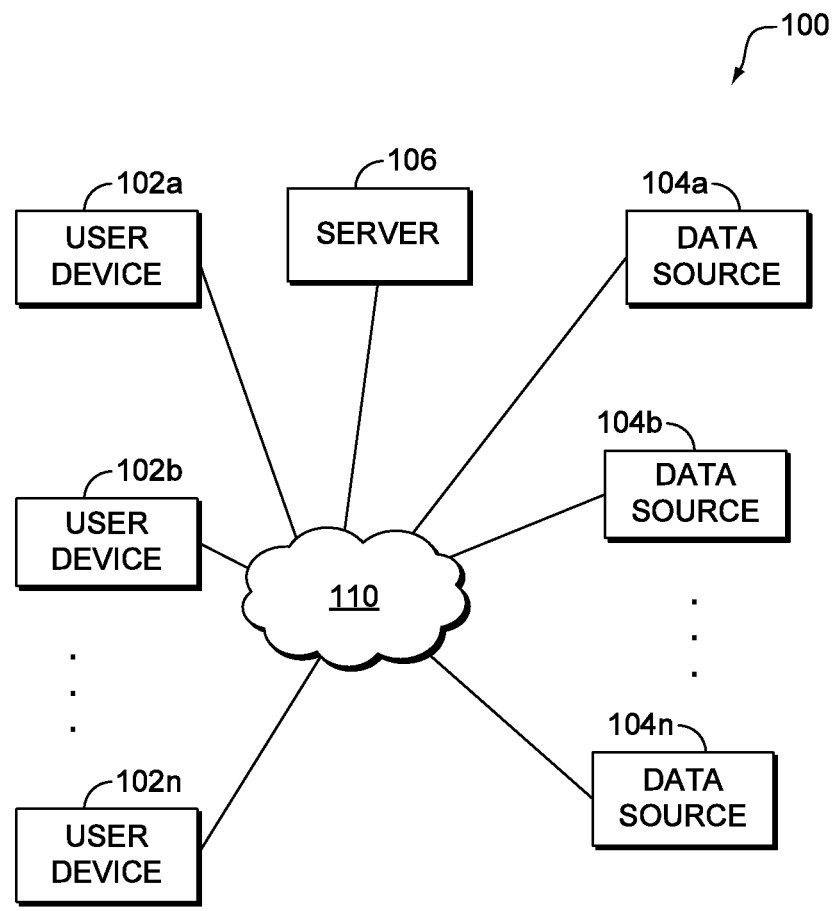
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present disclosure relate to inferring logical locations of a user based on semantics of the user's computing devices. The logical locations may correspond to one or more venues visited by a user, such as frequently visited venues or hubs. Examples of hubs may include the user's home, office, gym, favorite coffee house, parent's house, or similar venues. In particular, a given user's user device may be associated with a logical hub based on one or more device signals or features, such as device usage, which may include patterns, or device characteristics. Based on the associated logical hub(s), a user's logical location may be inferred and may be used for facilitating personalization.

The coalescence of telecommunications and personal computing technologies in the modern era has enabled, for the first time in human history, information on demand combined with a ubiquity of personal computing resources (including personal computing devices and cloud-computing coupled with communication networks). But at the same time, it is now possible to overwhelm users with irrelevant or unuseful (including untimely) information. As a result, new computer technologies are emerging for tailoring computing services and information delivery to users, based on circumstances or other information that is specific to those users. Such personalization of computing services can include providing information to the user (including filtering or withholding information) in a timely manner when it is most useful or needed and/or providing information that is specifically relevant to that user. One aspect of a user's circumstance that may be used by such computing services to tailor the personal computing experience to the user (and in some cases, may be available to such services on demand) includes user-location-related information, which may be sensed or otherwise determined by the new computer technologies.

But as described previously, sometimes accurate location information for the user is not available, such as for static computing devices like desktop computers, other user devices lacking location-detection functionality, like wearable fitness devices, or user devices having the location detection functionality disabled. Additionally, even where information about a user's physical location is available, the user's logical location may not correspond to the physical location, such as where a user is at their home but working on their work computer. Typically under such circumstances, a user is not provided with a personalized user experience by the computer system or any personalization that is provided is limited. Accordingly, some embodiments of the present disclosure address these new technological problems by providing solutions for inferring logical locations of a user based on semantics of a user's computing device. In particular, a user device may be associated with a logical hub based on one or more signals or features of the user device, such as device usage or device characteristics.

Accordingly, at a high level, in one embodiment, user data is received from one or more data sources. The user data may be received by collecting user data with one or more sensors or components on user device(s) associated with a user. Examples of user data, also described in connection to component 210 of FIG. 2, may include information about the user device(s), user-activity associated with the user devices (e.g., app usage, online activity, searches, calls, usage duration, and other user-interaction data), network-related data (such as network ID, connection data, or other network-related information), application data, contacts data, calendar and social network data, or nearly any other source of user data that may be sensed or determined by a user device or other computing device. The received user data may be monitored and information about the user may be stored in a user profile, such as user profile 240 of FIG. 2.

User data may be used for determining various features associated with each user device. These device features may be sensed or otherwise detected, analyzed, and used for classifying the user device as being associated with a particular logical hub. For example, a first user device belonging to a user may be identified as a "home" device (wherein the logical hub is home); a second user device may be identified as an "office" device; etc. In one embodiment, user devices are tagged according to the one or more classified hubs, such as "home," "office," "gym," "home and office", or similar venues. By analyzing features of a user device, corresponding logical hub(s) may be determined, and the user device may be tagged, mapped to, or otherwise associated with those hub(s). Without limitation, examples of user device features may include time-related features, device characteristics, usage-related features, and complementary features. Additional details of device features are described in connection to device features identifier 290 of FIG. 2.

Upon detecting user activity on the user device, a logical location of the user may be inferred based on the logical hub(s) determined to correspond to that particular user device. For example, using characteristics of a user device, user interactions with the device, or other detected features, the computer system may infer that a particular user is logically at her office hub or her home hub. In some embodiments, a set of classification logic, such as rules, conditions, or associations, and/or classification models may be utilized for associating a user device with one or more logical hubs and/or for resolving a user's logical location based on detected device activity. For example, in one embodiment, a trained probabilistic classifier is used. In one implementation the classifier comprises a multinomial mixture model.

As described herein, the logical hubs do not necessarily require a corresponding physical location, nor do the processes disclosed herein, for determining logical hubs (or inferring the logical location of a user), require using location information. Rather, the logical hub(s) may be identified using other features of the device. In particular, some embodiments described herein do not rely on location-detection functionality, such as GPS, or utilize location-detection information, such as provided by GPS or derived from Wi-Fi, IP address, or similar geographical location detection technologies. In this way, such embodiments are suitable for implementation with devices that do not have functionality for providing accurate location information, such as desktop computers and other static devices, for other user devices lacking location-detection functionality, like wearable fitness devices, or for user devices wherein the location detection functionality is disabled, for example.

The inferred logical location of the user may be provided to a computerized personal assistant application or otherwise consumed by an application or service on the computer system. Based on the inferred logical location of the user, the computer system may personalize the user experience, such as by modifying the delivery or presentation of certain communications, reminders, or other notifications, or by providing or tailoring certain applications, services, or other content, for example. To this end, a user may be provided with such content at a time when the user would most likely desire to receive it and not provided with it at a time when it is likely to be dismissed, ignored, or bothersome.

Additionally, some embodiments may further determine or infer the importance (or significance) of a logical hub to the user based on the frequency and/or duration that the user is present at the logical hub, which may be determined by the frequency or duration of user interactions with devices associated with those logical hubs. For example, a user's logical home hub and logical office hub are likely to be determined to be more important and may be considered major logical hubs, whereas the user's logical gym may be considered a minor hub, since it is likely that the user will spend less time interacting with devices associated with the logical gym hub than time spent interacting with devices associated with the logical home hub or logical office hub.

In some cases, a single logical hub may correspond to multiple physical locations. For example, consider the scenario where a user travels to different coffee shops or other physical locations and uses her work laptop, which has been tagged as being associated with her office hub. At each of the different physical locations, it may be inferred that the user is logically located in her office hub, according to some embodiments. Although she may visit each specific coffee shop infrequently in this example, she nevertheless uses her work laptop at each location, and therefore may be considered in her office hub at each location. Accordingly, her office hub may be considered a frequently visited logical location. Suppose the user sets a reminder, such as "remind me to call Ido when I get to work." No matter which coffee shop the user visits next, after interacting with her laptop device, it may be determined that she is in her office hub, and thus she may be presented with the reminder to call Ido. Additionally, in contrast to a physical hub, which has a defined physical geographical boundary or definition, a logical hub, in some embodiments of the disclosure, may correspond to traveling or similar state of the user, such as driving a car, riding on a train, flying, or the like. In particular, such embodiments may be utilized where a user has specific activity associated with these states but not with other hubs, such as activities related to work, home, gym, etc.

In some embodiments, a corresponding confidence weight or confidence score may be determined regarding the accuracy of the association(s) between a user device and one or more logical hubs or the accuracy of an inferred logical location of the user. In some instances, the confidence score may be considered when personalizing the user experience. For example, an important work-related reminder nevertheless may be presented to the user if it is determined with a weak confidence that the user is logically at home. Additionally, where a lower confidence exists about an inferred logical hub, user interaction with the device maybe further monitored to determine additional features. Further, some embodiments may utilize crowdsourcing for additional features from a population of similar users. For example, in one embodiment that uses crowdsourcing, information about the interactions of other users in semantically similar situations as a particular user, such as other users using the same device and/or similar usage patterns) may be used for determining additional features, which may be imputed onto the particular user's user device.

In some embodiments, user feedback may be determined regarding the accuracy of the inferred logical hub. The feedback may be determined based on user response to a tailored or personalized experience, such a timely notification, derived from contextual information determined from user data, or explicitly provided by the user, such as from prompting the user for feedback. For example, contextual information may indicate that the user just ordered a pizza online and is having the pizza delivered to a location corresponding to the user's home. This contextual information would reinforce an inference that the user is at her home hub. As a second example, in one embodiment, a notification presented to the user may also include information indicating that the notification is being provided because the user is believed to be in her office. A user may be asked to confirm whether this is correct. Alternatively, if a user were to respond to this notification by asking the computerized personal assistant to remind her of the notification once she is back in her office, then it may be determined that the user is not presently, logically located in her office. In this instance, the user's feedback contradicts the determination that the user is logically at her office.

In some embodiments, this feedback may be utilized for weighting the user-device features used to infer the logical hub(s) associated with the user device. For example, the coefficients corresponding to user-device features (or other parameters) used by a classification model, to determine a logical hub inference or logical location of the user, may be adjusted based on positive or negative feedback.

Some embodiments further include using user data from other users or user devices associated with other users (such as crowdsourcing data) for identifying logical hubs and determining rules and/or classification models used for associating the detected features with logical hubs. Additionally, some embodiments may be carried out by a personal assistant application or service, which may be implemented as one or more computer applications, services, or routines, such as an app running on a mobile device or the cloud, as further described herein.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; and network 110. It should be understood that environment 100 shown in FIG. 1 is an example of one suitable operating environment. Each of the components shown in FIG. 1 may be implemented via any type of computing device, such as computing device 600 described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n may be client devices on the client-side of operating environment 100, while server 106 may be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 6 herein. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable device.

Data sources 104a and 104b through 104n may comprise data sources and/or data systems, which are configured to make data available to any of the various constituents of operating environment 100, or system 200 described in connection to FIG. 2. (For example, in one embodiment, one or more data sources 104a through 104n provide (or make available for accessing) user data to user-data collection component 210 of FIG. 2.) Data sources 104a and 104b through 104n may be discrete from user devices 102a and 102b through 102n and server 106 or may be incorporated and/or integrated into at least one of those components. In one embodiment, one or more of data sources 104a though 104n comprise one or more sensors, which may be integrated into or associated with one or more of the user device(s) 102a, 102b, or 102n or server 106. Examples of sensed user data made available by data sources 104a though 104n are described further in connection to user-data collection component 210 of FIG. 2.

Figure 2:
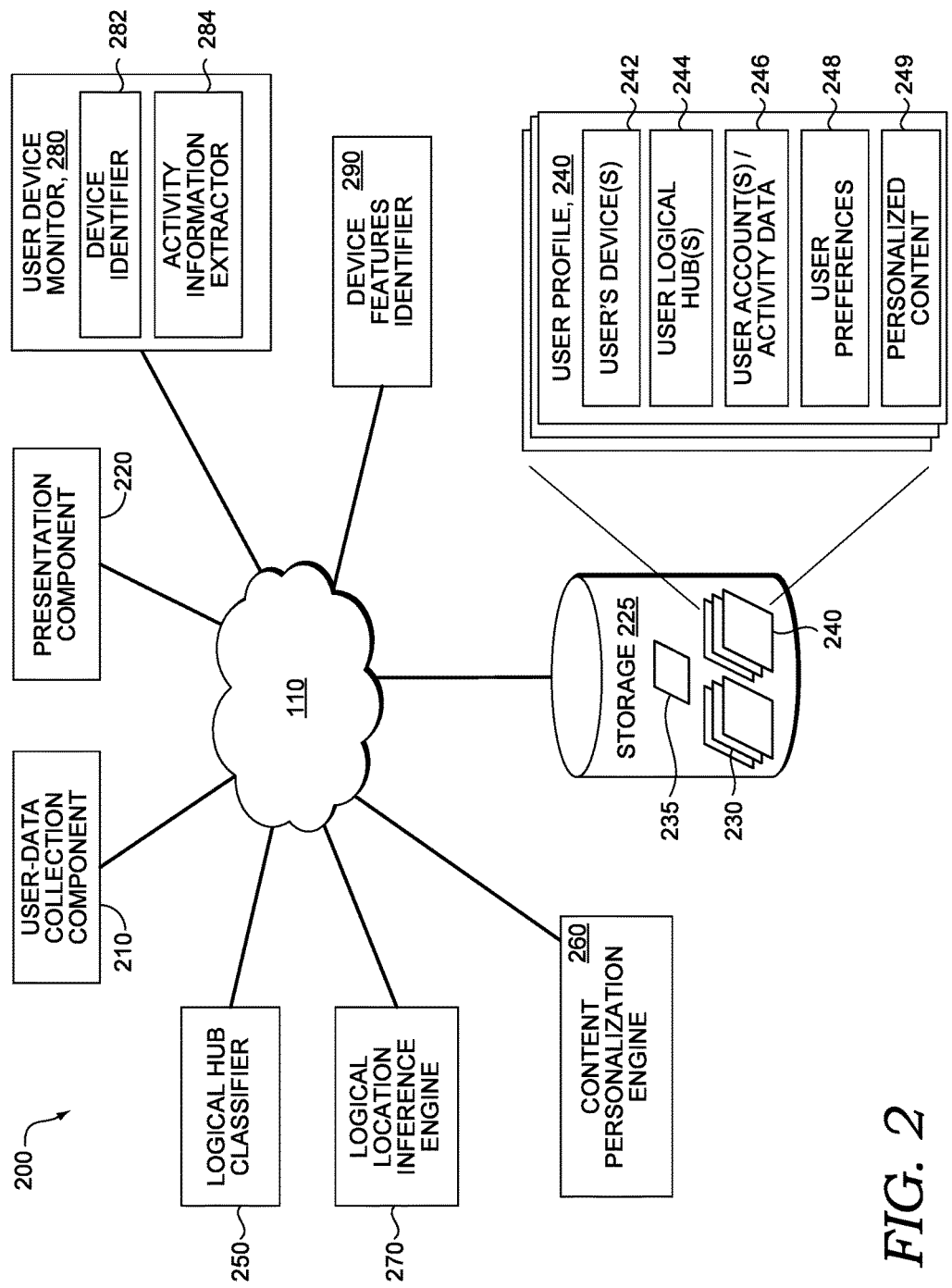
FIG. 2 is a diagram depicting an example computing architecture suitable for implementing aspects of the present disclosure.
Figure 3:
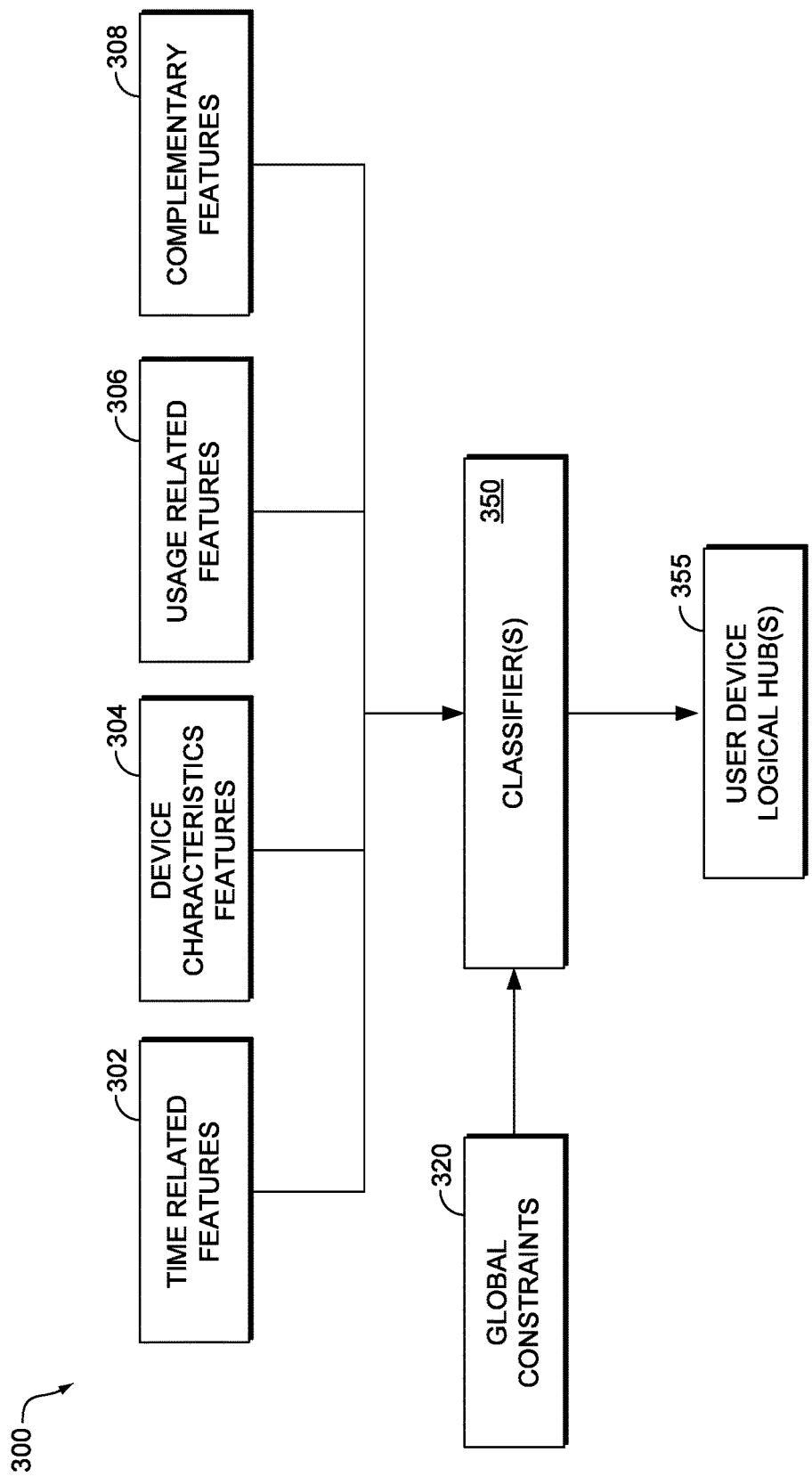
FIG. 3 illustratively depicts aspects of a classification system for determining a logical hub associated with a user device, based on one or more features related to the user device, in accordance with an embodiment of the present disclosure.

Operating environment 100 can be utilized to implement one or more of the components of system 200, described in FIG. 2, and system 300, described in FIG. 3, including components for collecting user data, monitoring events, generating notification content, and/or presenting notifications and related content to users. Referring now to FIG. 2, with FIG. 1, a block diagram is provided showing aspects of an example computing system architecture suitable for implementing an embodiment and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 210, presentation component 220, user device monitor 280, device features identifier 290, logical hub classifier 250, logical location inference engine 270, content personalization engine 260, and storage 225. User device monitor 280 (including its components 282 and 284), content personalization engine 260, user-data collection component 210, presentation component 220, logical hub classifier 250, logical location inference engine 270, and device features identifier 290 may be embodied as a set of compiled computer instructions or functions, program modules, computer software services, or an arrangement of processes carried out on one or more computer systems, such as computing device 600 described in connection to FIG. 6, for example.

In one embodiment, the functions performed by components of system 200 are associated with one or more personal assistant applications, services, or routines. In particular, such applications, services, or routines may operate on one or more user devices (such as user device 102a), servers (such as server 106), may be distributed across one or more user devices and servers, or be implemented in the cloud. Moreover, in some embodiments, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

Continuing with FIG. 2, user-data collection component 210 is generally responsible for accessing or receiving (and in some cases also identifying) user data from one or more data sources, such as data sources 104a and 104b through 104n of FIG. 1. In some embodiments, user-data collection component 210 may be employed to facilitate the accumulation of user data of one or more users (including crowd-sourced data) for, among other things, user device monitor 280. The data may be received (or accessed), and optionally accumulated, reformatted, and/or combined, by user-data collection component 210 and stored in one or more data stores such as storage 225, where it may be available to user device monitor 280. For example, the user data may be stored in or associated with a user profile 240, as described herein. In some embodiments, any personally identifying data (i.e., user data that specifically identifies particular users) is either not uploaded from the one or more data sources with user data, is not permanently stored, and/or is not made available to user device monitor 280.

User data may be received from a variety of sources where the data may be available in a variety of formats. For example, in some embodiments, user data received via user-data collection component 210 may be determined via one or more sensors, which may be on or associated with one or more user devices (such as user device 102*a*), servers (such as server 106), and/or other computing devices. As used herein, a sensor may include a function, routine, component, or combination thereof for sensing, detecting, or otherwise obtaining information such as user data from a data source 104*a*, and may be embodied as hardware, software, or both. By way of example and not limitation, user data may include data that is sensed or determined from one or more sensors (referred to herein as sensor data), such as properties or characteristics of the user device(s), user activity information, which may be associated with the user device(s) (for example: app usage information; online activity; searches; usage duration; and other user-interaction data; voice data such as automatic speech recognition; activity logs; communications data including calls, texts, instant messages, and emails; website posts; other user data associated with communication events; user history; session logs; etc.) including, in some embodiments, user activity that occurs over more than one user device; network-related information (e.g., network name or ID, domain information, workgroup information, connection data, or other network-related information), application data, contacts data, calendar and schedule data, notification data, social network data, smartphone data (such as phone state, charging data, date/time, or other information derived from a smartphone), news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personal assistant application or service), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, payment or credit card usage data (which may include information from a user's PayPal account), purchase history data (such as information from a user's Amazon.com or eBay account), other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, cellular network, or IP address data), and nearly any other source of data that may be sensed or determined as described herein. In some embodiments user data includes location information where it is available to be sensed or otherwise detected from a user device. However, as described previously, in some embodiments, user data does not include information enabling an accurate location determination of the user device.

In some respects, user data may be provided in user-data streams or signals. A "user signal" can be a feed or stream of user data from a corresponding data source. For example, a user signal could be from a smartphone, a home-sensor device, a vehicle-sensor device, a wearable device, a user device, a gyroscope sensor, an accelerometer sensor, a calendar service, an email account, a credit card account, or other data sources. In some embodiments, user-data collection component 210 receives or accesses data continuously, periodically, or as needed.

User device monitor 280 is generally responsible for monitoring user data including data for user devices associated with a user, information related to the user devices, or other user data that may be used for facilitating identifying a particular user's user devices and extracting user device-activity information. As described previously, user device features may be determined by monitoring user data received from user-data collection component 210. In some embodiments, the user data and/or information about the user determined from the user data is stored in a user profile, such as user profile 240.

At a high level, embodiments of user device monitor 280 may determine, from the user data, one or more user devices associated with a particular user and user device related activity, (which may include contextual information associated with the identified user device(s)), which may be stored as part of a user device profile 230, data identifying a user's device(s) 242 of user profile 240, or user account(s)/activity data 246 of user profile 240. In an embodiment, user device monitor 280 comprises one or more applications or services that analyze the user devices used by the user to determine information about the devices and device usage. In some embodiments, user device monitor 280 monitors user data associated with the user devices and other related information on a user device, across multiple computing devices or in the cloud. Information about the user's user devices may be determined from the user data made available via user-data collection component 210, and maybe provided to devices feature identifier 290 or logical location inference engine 270, among other components of system 200.

As shown in example system 200, user device monitor 280 comprises a device identifier 282 and activity information extractor 284. In some embodiments, user device monitor 280, one or more of its subcomponents, or other components of system 200, such as device features identifier 290 or logical location inference engine 270, may determine interpretive data from received user data. Interpretive data corresponds to data utilized by these components of system 200 or subcomponents of user device monitor 280 to interpret user data. For example, interpretive data can be used to provide context to user data, which can support determinations or inferences made by the subcomponents. For example, in some embodiments interpretive data comprises statistical ratios of feature values (sometimes referred to as "relative features") used for hub classification by logical hub classifier 250. Moreover, it is contemplated that embodiments of user device monitor 280, its subcomponents, and other components of system 200 may use user data and/or user data in combination with interpretive data for carrying out the objectives of the subcomponents described herein.

Device identifier 282, in general, is responsible for identifying user devices associated with a particular user. In some embodiments, device identifier 282 identifies a set of one or more devices by monitoring user data for user-device related information. Information about the identified devices provided by device identifier 282 may be used for determining features associated with the device (such as by device features identifier 290) in conjunction with information determined from activity information extractor 284, or for monitoring the identified devices, including user interactions with the identified devices, by user device monitor 280.

In some implementations, a user device may be identified by detecting and analyzing characteristics of the user device, such as device hardware, software such as operating system (OS), network-related characteristics, user accounts accessed via the device, and similar characteristics. For example, information about a user device may be determined using functionality of many operating systems to provide information about the hardware, OS version, network connection information, installed application, or the like.

Some embodiments of device identifier 282 determine a device name or identification (device ID) for each device associated with a user. This information about the identified user devices associated with a user may be stored in a user profile associated with the user, such as in user's devices 242 of user profile 240. In an embodiment, the user devices may be polled, interrogated, or otherwise analyzed to determine information about the devices. This information may be used for determining a label or identification of the device (e.g. a device id) so that the user interaction with device may be recognized from user data by user device monitor 280. In some embodiments, users may declare or register a device, such as by logging into an account via the device, installing an application on the device, connecting to an online service that interrogates the device, or otherwise providing information about the device to an application or service. In some embodiments devices that sign into an account associated with the user, such as a Microsoft® account or Net Passport, email account, social network, or the like, are identified and determined to be associated with the user.

Activity information extractor 284, in general, is responsible for extracting from the user data information about user interactions with a user device, user activity associated with a particular user device, which may include current user activity, or related information such as contextual information. Examples of such activity information may include app usage, online activity, searches, calls, usage duration, application data (e.g. emails, messages, posts, user status, notifications, etc.), or nearly any other data related to user interactions with the user device. Among other components of system 200, the extracted activity information determined by activity information extractor 284 may be provided to device features identifier 290 or logical location inference engine 270, and may be stored in a user profile, such as in user account(s) activity data 246 of user profile 240. In some embodiments, activity information extractor 284, or device monitor 280 performs conflation on the user device information or extracted activity information. For example, overlapping information may be merged and duplicated or redundant information eliminated.

In some cases, extracted activity information may include contextual information associated with the monitored devices and/or user activity. Contextual information may be determined from the user data of one or more users provided by user-data collection component 210 in lieu of or in addition to the user activity information. For example, activity information extractor 284 may receive user data, parse the data, in some instances, and identify and extract context features or variables (which may also be carried out by device features identifier 290). In some embodiments, variables are stored as a related set of contextual information associated with a user device or user interaction session with a device, and may be stored in a user profile. In some embodiments, contextual information may be used by content personalization engine 260 for logic for personalizing content or a user experience, such as when, where, or how to present notification content.

User device monitor 280, or subcomponents 282 or 284, may search and/or analyze user data for any of a variety of user-device related data including user device variables. By matching user data to one or more user devices and/or device variables thereof, device monitor 280 may detect and monitor the devices and user interactions with those devices from the user data. In some embodiments, user device variables may be tracked (such as monitored and/or stored) by user device monitor 280 with respect to a corresponding detected instance of a device. In particular, values corresponding to tracked device variables may be stored in association with a user, for example, with respect to a corresponding one of user profiles 240, in user's devices 242 or in a user device profile 230. Tracked variables can correspond to any of a variety of user data related to the user device, examples of which have been described above and include sensor data or readings, which may be sensed by one or more sensors (such as information associated with a user device regarding device characteristics, network or communication related information, position/motion/orientation, user-access/touch, connecting/disconnecting a charger, user activity on the user device, or other information that may be sensed by one or more sensors, such as sensors found on a mobile device), or the like. It will be appreciated that values of tracked variables may be associated with one or more user devices and/or user activity and need not be device specific specific. An example of a tracked variable is a time stamp corresponding to a respective instance of a user interaction with a user device. The time stamp can indicate the relative order or sequence of an interaction with the device with respect to other interactions, and optionally instances of one or more other user device interactions of a corresponding routine or pattern, which may be identified as a device feature, as further described below.

As a further example, interaction with a user device may comprise data indicating a user has accessed a web browser the user device. One tracked variable may correspond to a particular website, series of websites, or category of websites (e.g. entertainment, news, financial, children-related, shopping, etc.) accessed by the user. It will be appreciated that the level of granularity in the detection and tracking of potential user interactions with user devices can vary. Thus, as an example, a particular visited website need not be a tracked variable. Furthermore, other examples of potential tracked variables, or more generally device-related variables are further described in connection to device features identifier 290. Additionally, although several examples of how user device monitor 280 or device identifier 282 may make such determinations are described herein, many variations of user device identification and user device monitoring are possible in various embodiments of the disclosure.

Continuing with system 200 of FIG. 2, device features identifier 290 is generally responsible for determining device features of user devices. In some embodiments, device features identifier receives information from user device monitor 280, such as device characteristics or other information about a specific user device and/or activity information, and analyzes the received information to determine a set of features associated with the user device.

Alternatively, in some embodiments, device features identifier 290 accesses or otherwise receives user data, such as from user-data collection component, and analyzes the user data to identify a device and determine a set of device features for the device. The device features of a particular user device, determined by device features identifier 290, may be used by logical hub classifier 250 to classify the particular device as being associated with one or more logical hubs. Embodiments may use as many features as are available, able to be determined, or needed for classification.

The term "user device features" as used herein may broadly refer to any information about or related to a user device, including information regarding the user and other user device associated with the user, that may be used by logical hub classifier 250 or other components of system 200. Without limitation, examples of user device features include: time related features, such as time(s) of day(s), day of week or month the device is used by the user, or length of usage; device characteristics, such as device type (e.g. desktop, tablet, mobile phone, fitness tracker, heart rate monitor, etc.) hardware properties or profiles, OS or firmware properties, (which may include OS- or firmware-related information, OS level account(s), user-level accounts, and/or administrator-level accounts associated with the device, which may be present in an enterprise environment indicating the device is work-related), device IDs or model numbers, network-related information (e.g. mac address, network name, IP address, domain, work group, information about other devices detected on the local network, router information, proxy or VPN information, other network connection information, etc.); usage related features, such as app usage (which may also include application data), network usage information, online activity (e.g. searches, browsed websites, purchases, social networking activity, communications sent or received including social media posts, user device settings information, user account(s) accessed or otherwise used (such as device account(s) or online/cloud-services related account(s), such as Microsoft® account or Net Passport, online storage account(s), email or social networking accounts, etc.), number of users likely using the device; or complementary features, such as user calendar(s) information or contextual information, such as contextual information determined from user device monitor 280. Features may also include information about user(s) using the device; other information identifying a user, such as a login password, biometric data, which may be provided by a fitness tracker or biometric scanner; and/or characteristics of the user(s) who use the device. For example, if such features indicate diversity of usage (such as one batch of searches for Hello Kitty and another batch of searches for chi-squared distributions), then the user device is more likely a shared device used by more than one user (even if the device has only one account). In some instances, external features, such as features or information from other devices, may be identified and associated with a particular user device. For example, user device features (such as described previously) for other user devices associated with the user may be considered as user device features (which may be referred to as external features) for a particular user device associated with the user. In some instances, such external features may be used help classify a particular user device as being associated with a particular logical hub, to distinguish user devices, or to impute features onto a particular user device based on other semantically similar devices.

In some embodiments, complementary features, which may include contextual information, may be utilized to determine information about the device user(s) or device, used to facilitate determining logical hubs associated with the device or a user's logical location. For example, user availability information may provide insights about whether a user is at her logical office or logical home, such as where a user's calendar includes an entry like "meeting with client" or an entry like "time with kids." Such information may be determined using calendar information from one or more user calendars, such as office calendars, personal calendars, social media calendars, or even calendars from family members or friends of the user, in some instances. Some implementations construct a complementary or shadow calendar for the user, for use in determining complementary features.

In some embodiments, feature logic, which may include rules, conditions, or associations, may be utilized to identify features from user data, such as in the previous example with Hello Kitty where multiple users may be determined based on usage diversity. In addition, semantic analysis may be performed on information in the user data or device information provided by device monitor 280.

In some embodiments, device features may comprise pattern features, such as patterns of detected user interactions with user device(s). For example, a user may use a particular user device, such as a fitness tracker every Monday, Wednesday, and Saturday. Example approaches are described below, where each instance of a user device interaction has corresponding historical values of tracked variables that form patterns, and device feature identifier 290 may evaluate the distribution of the tracked variables for patterns. In the following example, a tracked variable for a user device interaction is a time stamp corresponding to an instance of the interaction. However, it will be appreciated that, conceptually, the following can be applied to different types of historical values.

A bag of time stamps (i.e., values of a given tracked variable) can be denoted as $\{t_m\}_{m=1}^{M}$, and mapped to a two-dimensional histogram of hours and days of the week. The two-dimensional histogram can comprise a summation over the instances of the user-device interaction, such as:

$$h_{ij} = \Sigma_{m=1}^{M} I[\text{dayOfWeek}[t_m]=i] \wedge I[\text{hourOfDay}[t_m]=j].$$

This histogram can be used to determine derivative histograms. For example, a day of the week histogram may correspond to: $h_j = \Sigma_i h_{ij}$. An hour of the day histogram may correspond to: $h_i = \Sigma_j h_{ij}$. As further examples, one or more histograms may be determined for particular semantic time resolutions in the form of: $h_{iC} = \Sigma_{j \in C} h_{ij}$. Any of various semantic time resolutions may be employed, such as weekdays and weekends, or morning, afternoon, and night. An example of the latter is where $C \in \{\text{morning, afternoon, night}\}$, morning=$\{9, 10, 11\}$, afternoon=$\{12, 13, 14, 15, 16\}$, and night=$\{21, 22, 23, 24\}$.

An additional data structure utilized in representing an event can comprise the number of distinct time stamps in every calendar week that has at least one time stamp therein, which may be represented as:

$$w_i^j = \|\{m | t_m \text{ is within the } i\text{-th } j \text{ week period}\}\|.$$

As an example, $w_2^3$ can denote the number of distinct time stamps during the $2^{nd}$ three-week period of available time stamps. $N^{(j)}$ may be utilized to denote the number of j-week time stamps available in the tracked data; for example, $N^{(3)}$ denotes the number of three-week periods available in the time stamps.

Device feature identifier 290 (or user device monitor 280) may generate a confidence score that quantifies a level of certainty that a particular pattern is formed by the historical values in the tracked variable. In the following example, the above principles are applied utilizing Bayesian statistics. In some implementations, a confidence score can be generated for a corresponding tracked variable that is indexed by a temporal interval of varying resolution. For time stamps, examples include Tuesday at 9 am, a weekday morning, and a Wednesday afternoon. The confidence score may be computed by applying a Dirchlet-multinomial model and computing the posterior predictive distribution of each period histogram. In doing so, a prediction for each bin in a particular histogram may be given by:

$$x_i = \frac{\alpha_0 + h_i}{\sum_{i}^{K}(\alpha_0 + h_i)};$$

where K denotes the number of bins, $\alpha_0$ is a parameter encoding the strength of prior knowledge, and $i^* = \arg\max_i x_i$. Then, the pattern prediction is the bin of the histogram corresponding to $i^*$ and its confidence is given by $x_{i^*}$. As an example, consider a histogram in which morning=3, afternoon=4, and evening=3. Using $\alpha_0=10$, the pattern prediction is afternoon, and the confidence score is $$\frac{10+4}{(10+3)+(10+4)+(10+3)} = \frac{14}{40} \approx 0.35.$$

In accordance with various implementations, more observations result in an increased confidence score, indicating an increased confidence in the prediction. As an example, consider a histogram in which morning=3000, afternoon=4000, and evening=3000. Using a similar calculation, the confidence score is $$\frac{4010}{10030} \approx 0.4.$$

Also, in some implementations, a confidence score can be generated for a corresponding tracked variable that is indexed by a period and a number of time stamps. Examples include 1 visit per week, and 3 visits every 2 weeks. Using a Gaussian posterior, a confidence score may be generated for a pattern for every period resolution, denoted as j. This may be accomplished by employing the formula:

$$\widehat{\mu^{(j)}} = \lambda\left(\frac{1}{N^{(j)}}\sum_{i}^{N^{(j)}} w_i^{(j)}\right) + (1-\lambda)\mu_0, \text{ where } \lambda = \frac{\sigma_0^2}{\frac{\sigma^2}{N^{(j)}} + \sigma_0^2}.$$

In the foregoing, $\sigma^2$ is the sample variance, and $\sigma_0^2$ and $\mu_0$ are parameters to the formula. A confidence score can be computed by taking a fixed interval around the number of time stamps prediction and computing the cumulative density as:

$$\mathrm{conf}_j = P(|x - \widehat{\mu^{(j)}}| < a) = \int_{\widehat{\mu^{(j)}}-a}^{\widehat{\mu^{(j)}}+a} \mathcal{N}(x \mid \widehat{\mu^{(j)}}, \hat{\sigma}^{(j)}),$$

where $\hat{\sigma}^{(j)} = \frac{1}{\frac{N^{(j)}}{\sigma^2} + \frac{1}{\sigma_0^2}}$.

As an example, consider the following observations: $w_1^{(1)}=10$, $w_2^{(1)}=1$, $w_3^{(1)}=10$, $w_4^{(1)}=0$, $w_1^{(2)}=11$, and $w_2^{(2)}=10$. $N^{(1)}=4$ and $N^{(2)}=2$. Using $\mu_0=1$ and $\sigma_0^2=10$, $\mu^{(1)}=4.075$, and $\mathrm{conf}_1=0.25$. Furthermore, $\mu^{(2)}=10.31$ and $\mathrm{conf}_2=0.99$. In the foregoing example, although fewer time stamps are available for two week periods, the reduced variance in the user signals results in an increased confidence that a pattern exists.

Having determined that a pattern exists, or that the confidence score for a pattern is sufficiently high (e.g., satisfies a threshold value), device features identifier 290 may identify that a series of user-device interactions corresponds to a user-interaction pattern (a feature) for the user. As a further example, device features identifier 290 may determine that a user-device interaction of a pattern is being practiced by a user where one or more of the confidence scores for one or more tracked variables satisfy a threshold value. In this regard, an interaction of a pattern of device interactions may be determined as being practiced based on device features identifier 290 identifying one or more patterns in historical values of one or more tracked variables associated with the user device.

In some embodiments, patterns of user interactions with the user device(s) (i.e., feature patterns) may be determined by monitoring one or more variables related to the user device(s) and/or user data associated with those devices, as described previously. These monitored variables may be determined from the user data described previously as tracked variables or as described in connection to user-data collection component 210. In some cases, the variables can represent context similarities among multiple user-interactions with the device. In this way, patterns may be identified by detecting variables in common over multiple user interactions. More specifically, variables associated with a first user interaction with a device may be correlated with variables of a second user interaction with the device to determine a likely pattern. An identified feature pattern may become stronger (i.e., more likely or more predictable) the more often the user interaction instances that make up the pattern are repeated. Similarly, specific variables can become more strongly associated with a user interaction pattern as they are repeated.

Accordingly, device features identifier 290 determines a set of features associated with a user device, which may be used by logical hub classifier 250 to classify the particular device as being associated with one or more logical hubs. In some embodiments, the device features identified by component 290 may be stored in a user device profile, such as device profile 230.

Continuing with system 200 of FIG. 2, logical hub classifier 250 is generally responsible for determining one or more logical hubs associated with a user device. Embodiments of logical hub classifier 250 may apply hub classification logic to one or more device features for a device (which may be determined from device features identifier 290) to determine likely logical hub(s) associated with the device. For example, based on a set of device features of a particular device (which may include external features regarding other user devices), logical hub classifier 250 may determine that the particular device is associated with a user's office hub, home hub, or both. As described previously, in some embodiments, logical hub classifier 250 tags or labels the user device as being associated with a particular logical hub. In some instances, the logical hub tag may be considered a characteristic of the device, and the tags may be stored as part of the device profile, such as in device profile 230.

In some embodiments, hub classification logic comprises a set of rules, conditions, associations, and/or ordered processes for determining likely hub associations. Classification logic might specify analyzing specific features or the values associated with specific features (e.g. the number of users of the device is greater than one (i.e. multiple people use the device), which may be used to infer that the device is associated with a home hub based on a rule or association that multiple device users are more likely to occur with a home device, or whether a usage feature pattern indicates that the device is primarily used during working hours on weekdays, which may be used to infer that the device is likely associated with an office hub). In one embodiment, hub classification logic may include evaluating Boolean expressions of device features, such as "if feature X and feature Y and not feature Z, then resolve to home hub.

Some embodiments of hub classification logic may include one or more global constraints, which may include rules or conditions that assign weights to various device features. For example, global constraints may specify that some features are weighted greater than other features (e.g. a pattern feature of using the device during working hours may be weighted more in some cases than a feature regarding the app usage on the device.) Global constraints may also include overriding rules; for example, if feature x and feature y are present, then the hub classifier does not resolve the hub as office no matter what other features are present, or the maximum number of devices that can be associated with a user's logical gym hub is three, or that most users will have only one logical home hub.

Global constraints (or other hub classification logic) may specify conditions for determining that a logical hub corresponds to the specific user device, such as rules or conditions for matching features of a particular device with features that are determined to be characteristic of devices associated with specific logical hubs. For example, devices that are associated with a home hub are more likely to be used on weekends, thus where a particular device has usage features indicating the device is frequently used on weekends, logical hub classifier 250 may determine an increased likelihood that this particular device is associated with a logical home hub. Similarly, where device characteristics features indicate that a user device has an administrator account that is associated with a different user than is associated with the user device or a user account on the user device, logical hub classifier 250 may determine an increased likelihood that this particular device is associated with a logical office hub, since it is common in enterprise situations for organizations to have policies that provide employees with non-administrator level accounts. Other associations or instances of hub classification logic may include, by way of example and not limitation, associations between usage of certain applications (app usage features) and specific hubs (e.g., usage of Netflix or a gaming application may indicate that the device is likely associated with a logical home hub, but usage of certain productivity software, such as Microsoft® Visual Studio, may indicate the device is more likely associated with a logical office hub); associations between certain devices and specific hubs (e.g. device features corresponding to a bar code scanner device may indicate that the device is associated with a logical office hub. Similarly, a device features corresponding to a newer-model desktop computer device may indicate that the device is associated with a logical office hub, because currently most desktop purchases are by corporations and not individuals); associations between usage related features, such as online activity, and specific hubs (e.g. searches for academic papers may indicate that the device is associated with a logical office hub); as well as various device features typically found in office environments or home environments, such as a network domain, which may indicate that the device is associated with a logical office hub, for example.

Hub classification logic may also include the use of one or more classifiers; for example, trained classifiers or machine learning processes (including processes that employ supervised or unsupervised learning) that may be used to determine a statistical classification. In these embodiments, the device features and/or global constraints may be used as inputs to the classifier(s), with the output of the classifier including whether the device is associated with a particular logical hub, which logical hub(s) are associated with the device, and/or a likelihood of association with one or more logical hubs, depending on the specific classifier(s) employed. In one embodiment, the classifier includes a multinomial mixture model ("MMM"). Dirichlet mixture model (or Dirichlet compound multinomial, which may be considered a Bayesian version of an MMM), other mixture models, k-means, hierarchical clustering, or other method used for clustering vectors in high-dimensional feature spaces may be suitable, in certain embodiments. Other statistical classifiers (and models) suitable to provide a statistical classification of a hub or a determination of association between a logical hub and a user device are contemplated to be within the scope of embodiments of this disclosure. It is also contemplated that combinations of classifiers (or models) may be employed. Other examples of classifiers that may be utilized include, by way of example and not limitation, pattern recognition, fuzzy logic, neural network, finite state machine, support vector machine, clustering, logistic regression, or similar statistics or machine learning techniques are applied. For example, in one embodiment, device features may be fed into a trained neural network. In some embodiments, rules or other hub classification logic may be used initially to reduce the dimensionality before applying features to a classifier; for example by ruling out certain logical hubs so that a classifier is evaluating across fewer potential logical hub associations.

Figure 7A:
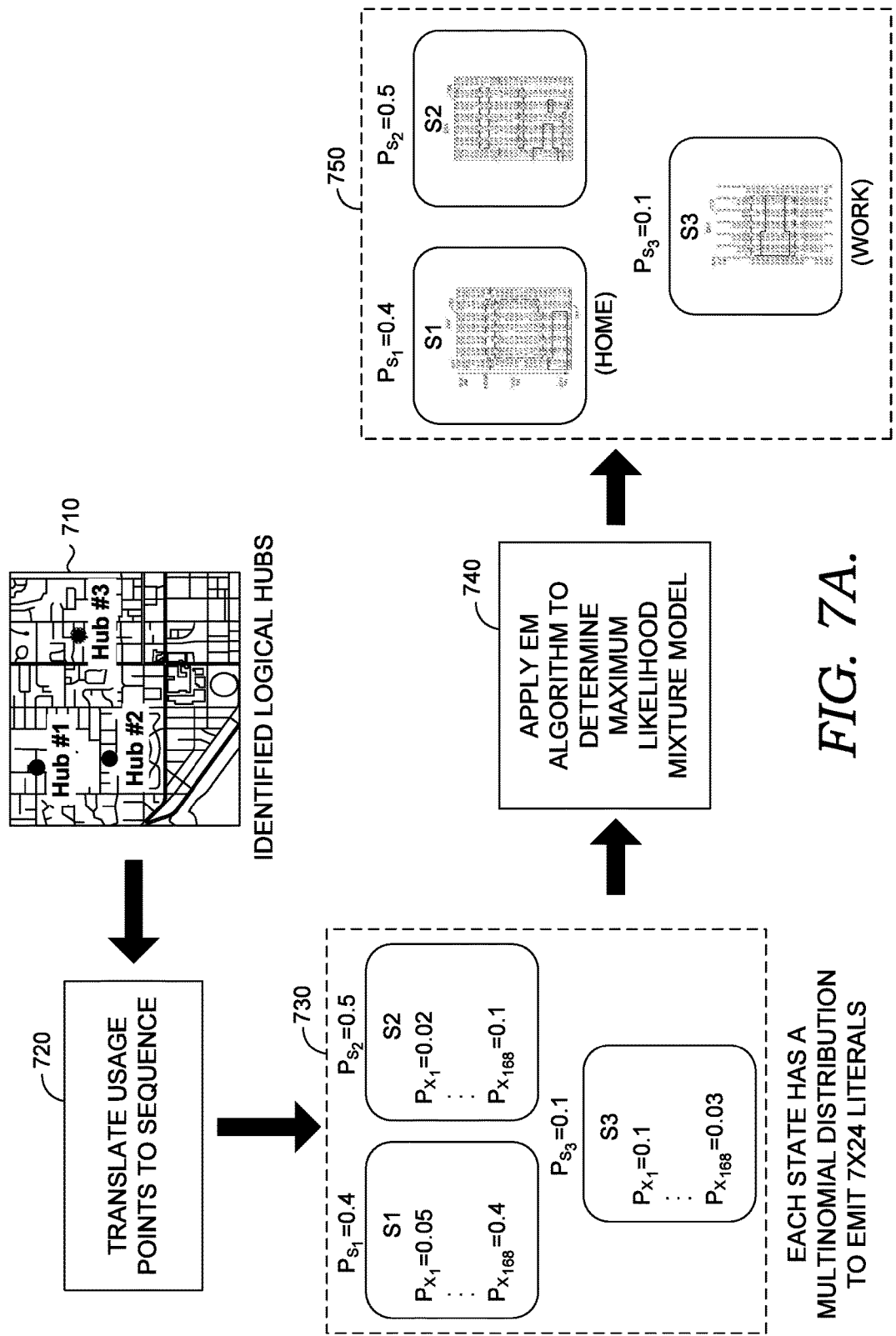
FIGS. 7A and 7B depict aspects of one example for a method to classify a logical hub, using a multinomial mixture model, in accordance with an embodiment of the present disclosure.
Figure 7B:
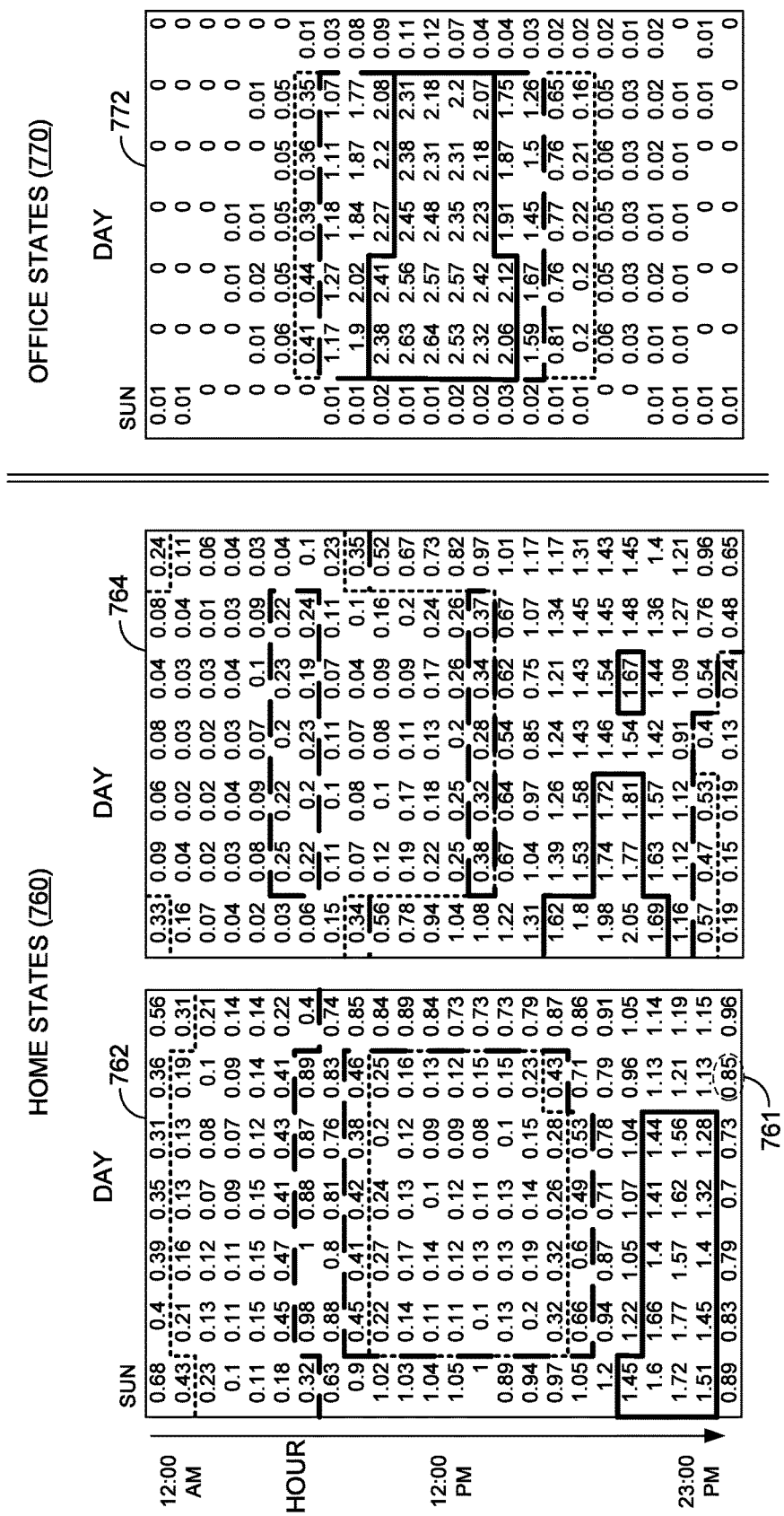

Turning briefly to FIGS. 7A and 7B, aspects of an example embodiment for a hub classification using MMM are illustratively provided. This example implementation uses an unsupervised learning approach that applies Expectation Maximization (EM) algorithm to produce the model. Logical hub-related features may include clustering density, number of days with data points, relative features (e.g. ratio of hub points out of all location points), user-related/usage features such as specific user activities, patterns, characteristics of the user, such as active vs. in-active, or other features, as described herein.

With regards to FIG. 7A, a map 710 of three identified logical hubs (Hub #1, Hub #2, and Hub #3) is shown. These logical hubs may correspond to logical locations (which may have corresponding physical locations) that a user "visits" or in which the user is present. In this example embodiment, each of the three logical hubs may be translated (at step 720) to a word composed of occurrences of 7×24 day and hour literals. (A literal is a constant value or fixed value; here day and hour. An example is shown as literal 761 on FIG. 7B.) Thus each week comprises 168 (7×24) literals. (Three examples are shown as 762, 764, and 772 in FIG. 7B). Each of the three logical hubs corresponds to a state S (e.g. S1, S2, and S3 in FIG. 7A). In this example embodiment, all words are equal and not weighted by length.

At 730, each state S has a multinomial distribution to emit each one of the 168 (7×24) day and hour literals. At 740, Expectation Maximization is applied to determine the maximal likelihood model. An illustrative output is shown as 750. With reference to FIG. 7B and continuing reference to FIG. 7A, home states (outputs of the model corresponding to logical home) are shown as 760, and office states (outputs of the model corresponding to logical office) are shown as 770. (Solid and dashed lines are added to items 762, 764, and 772 to indicate groupings of similar literals.) In particular, looking at item 762, which corresponds to state 1 (S1) in FIG. 7A, it can be seen that on weekends (Sunday and Saturday, corresponding to the left-most and right-most columns of literals) a user is more likely to be home; while during weekdays, the user is only home during the mornings and evenings. An opposite pattern can be seen for item 772, which reflects the office hub, or when the user is logically at work (i.e. typically during working hours on weekdays, as shown).

Turning back to FIG. 2, in some embodiments, a corresponding confidence weight or confidence score may be determined regarding the accuracy of the association(s) between a user device and one or more logical hubs or the accuracy of an inferred logical location of the user. (This confidence score is different that the confidence score described in regards to feature patterns, which represented a degree of confidence about a determined pattern.) A confidence score may correspond to a relative strength of an association between the user device and a logical hub, and may be impacted by various factors, such as the number of features relied on for determining the logical hub association; any weighting that may be applied to those features, which may include a weighting based on the age or staleness of the features); the presence of contradictory information (e.g. features indicating the device is only used on evenings and weekends with app usage during this productivity software, such as Visual Studio); or the specific classifier(s) that were used for the determination and the outcomes of those classifier(s), such as where a classifier provides a probabilistic output, for example. In some embodiments, each determined logical hub association for the device may have an associated confidence score. In some embodiments the logical hub having the highest confidence score is taken to be the logical hub associated with the user device, and in some embodiments, a confidence score for a logical hub association with a user device must exceed a threshold (such as 0.6) to be considered valid. The confidence scores may be considered when personalizing the user experience, in some implementations.

In some embodiments, hub classification logic maybe learned or inferred, such as from user data from other users. For example, associations of particular features with particular logical hubs may be learned based on observation frequency in the user data from other users. In some embodiments, hub classification logic (including any rules, conditions, associations, classification models, feature weights, model parameters, or the like) may be stored in storage as hub classification logic 235, where it may be accessed by logical hub classifier 250 as needed.

Example system 200 also includes logical location inference engine 270, which is generally responsible for inferring a logical location of a user. Embodiments of inference engine 270 may use information from device monitor 280 such as information about current user interactions with a device and/or device features from device features identifier 290 (such as feature patterns, identified usage related features, etc.) and information about the logical hub(s) associated with the user device to infer a logical location of the user. For example, based on detected user activity on a user device that is associated with a home hub, and device features for current app usage indicating the user is using the Netflix app, logical location inference engine 270 may infer that the user is logically at the home hub. In some embodiments, logical location inference engine 270 comprises a rule based or machine-learning-based inference engine that may utilize interpretive data to determine a logical location of the user.

In many instances, a user's logical location is determined as the logical hub associated with the user device being used by the user, or one of its associated logical hubs. In some instances, an inference may be determined that a user is not be at a particular logical hub, or is logically located at one hub and not another. For example, in some instances there may be conflicting features, such as where a user is using her office computer (the user is logically at her office hub), but the user's child is using a home computer that is also associated with the user. Suppose the user is programming in her Microsoft® Visual Studio application on her work computer, and her child is watching Hello Kitty videos online using a home computer that is signed into an account associated with the user. In this example, based on the device features or current activity information available, as well as information about the user, such as user activity history, the user may be inferred to be in her office hub, because, for example, features about the current activity is consistent with activity pattern features. In other words, this user has a pattern of using her office computer during the day and using productivity software such as Visual Studio. The currently detected activity includes conflicting information, but since some of the activity is consistent with the user's pattern, an inference can be made that the user is logically located at the hub associated with this consistent activity, which is the office hub. In some embodiments, where a user is using more than one user device, information may be considered about the logical hubs associated the other user devices being used by the user when inferring logical location. Moreover, in some circumstances, such as where a user is concurrently using a first device associated with a logical office hub and a second device associated with a logical home hub, the may be determined to be logically located in both hubs, or based on features about the current activity on one or both user devices, it may be determined that the user's activity is more consistent with either the home logical hub or the office logical hub. Based on this logical location inference determined by logical location inference engine 270, the user's computing experience may be personalized, as further described below. For example, content such as a work related notification for the user may be presented to the user via the user's work computer, but not presented to the user's child on the home computer that is nevertheless signed in to an account associated with the user.

Continuing with FIG. 2, example system 200 includes a content personalization engine 260. It is contemplated that some implementations of the disclosure may operate with content personalization engine 260 to facilitate providing a personalized user experience. Thus content personalization engine 260 may be considered one example of an application or service (or set of applications or services) that may consume information about logical hub(s) associated with a user device or inferred logical location information, as determined by implementations of the present disclosure.

At a high level, content personalization engine 260 is responsible for generating and providing aspects of personalized user experiences, such as personalized content or tailored delivery of content to a user. The content may be provided to the user as a personalized notification (such as described in connection to presentation component 220), may be provided to an application or service of the user (such as a calendar or scheduling application), or may be provided as part of an API where it may be consumed by another application or service. In one embodiment, the personalized content includes a notification which may comprise information, a reminder, a recommendation, communication-related data (e.g. an email, instant message, or call notification), or includes similar content that may be provided to the user in a way that is personalized. For example, as described previously, content may be provided at a time when the user would most likely desire to receive it, such as when the user is at a logical hub associated with the content (e.g. receiving work notifications when the user is at a logical office hub.) and not provided with content at a time when it is likely to be dismissed, ignored, or bothersome.

In some cases, the content may include content logic specifying conditions for presenting the content (or otherwise providing the information to the user) based on user data, such as time(s), location(s), mode(s), or other parameters relating to presenting information (such as a notification) from the content. For example, content may include a notification from about a utility bill, with logic that specifies the notification may be presented to the user when the user is at her logical home hub.

In some embodiments, content personalization engine 260 tailors content for a user to provide a personalized user experience. For example, content personalization engine 260 may generate a personalized notification to be presented to a user, which may be provided to presentation component 220. Alternatively, in other embodiments, content personalization engine 260 generates notification content and makes it available to presentation component 220, which determines when and how (i.e., what format) to present the notification based on content logic included with the content and user data, device features or inferred location information applied to the content logic. Further, in some embodiments, content personalization engine 260 generates content personalized to a user, such as content personalized based on the user's inferred location, and makes it available to an API or to another application or service, where it can be consumed.

In some embodiments, other services or applications operating in conjunction with presentation component 220 determine or facilitate determining when and how to present personalized content. Personalized content may be stored in a user profile 240, such as in a personalized content component 249.

Some embodiments of content personalization engine 260 evaluate user content to determine how to provide the content in an appropriate manner. For example, content that is determined to be work related may be withheld from presentation to a user until it is determined that the user is at her office hub. Evaluation of the content may be determined from a semantic analysis of the content and contextual information associated with the content (for example, key word extraction, analysis of the metadata or user history, or the like.) In some embodiments an inference engine may be used to classify content as being associated with a particular hub. Likewise, existing technologies utilized for personalizing user experiences based on a physical location of a user may be utilized by content personalization engine 260 to facilitate providing personalized experiences based on a logical location of the user.

Some embodiments of content personalization engine 260 may generate content logic, which may include conditions to facilitate delivery or presentation of content to a user. For example, content logic may specify that a work-related content should be provided to the user at a time when it is determined that the user is at her office hub, but not provided at a time when it is determined that the user is at her home hub. Similarly, content logic might specify not to present information about streaming movie recommendations when a user is determined to be at her logical home hub and it is Friday evening. The content logic may be stored in association with the content in user profile 240 (for example, in personalized content component 249). In some embodiments, content logic may be determined based on user preferences or settings (such as provided by user preferences 248), which may be explicitly provided by a user or inferred from usage related and time related features, which may include pattern features, or settings provided by other users.

It is also contemplated that some implementations of the present disclosure may provide personalized user experiences without a content personalization engine 260. For example, in one embodiment a fitness-related application or service for monitoring user workouts may determine that a user is working out or has completed a workout based on a determination that the user is at her logical gym hub, or was at her logical gym hub for a period of time. Suppose the user, using her fitness device, did not go to her normal gym, but instead went to run outside in a park. The fitness-related application or service can still determine that the user likely worked out, based on the usage of the device and the logical hub associated with it. In this case, the fitness-related application or service may record that the user completed her workout. Additionally, the fitness application or service may refrain from provide the user with a notification about missing her workout and rescheduling it that would otherwise have been provided upon determining, based on location information, that the user did not visit her usual gym.

Example system 200 also includes a presentation component 220 that is generally responsible for presenting content and related information to a user, based on the personalized content from content personalization engine 260. Presentation component 220 may comprise one or more applications or services on a user device, across multiple user devices, or in the cloud. For example, in one embodiment, presentation component 220 manages the presentation of personalized content to a user across multiple user devices associated with that user. Based on content logic, device features, associated logical hubs, inferred logical location of the user and/or other user data, presentation component 220 may determine on which user device(s) a content is presented, as well as the context of the presentation, such as how (or in what format and how much content, which can be dependent on the user device or context) it is presented, when it is presented, etc. In particular, in some embodiments, presentation component 220 applies content logic to device features, associated logical hubs, inferred logical locations, or sensed user data to determine aspects of content presentation.

In some embodiments, presentation component 220 generates user interface features associated with the personalized content. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. For example, presentation component 220 may query the user regarding accuracy of an inferred logical hub.

As described previously, in some embodiments, a personal assistant service or application operating in conjunction with presentation component 220 determines when and how (e.g. presenting when the user is determined to be at a specific logical location) to present the content. In such embodiments, the content, including content logic, may be understood as a recommendation to the presentation component 220 (and/or personal assistant service or application) for when and how to present the notification, which may be overridden by the personal assistant app or presentation component 220.

Example system 200 also includes storage 225. Storage 225 generally stores information including data, computer instructions (e.g., software program instructions, routines, or services), logic, profiles, and/or models used in embodiments described herein. In an embodiment, storage 225 comprises a data store (or computer data memory). Further, although depicted as a single data store component, storage 225 may be embodied as one or more data stores or may be in the cloud.

As shown in example system 200, storage 225 includes user device profiles 230, hub classification logic 235, and user profiles 240. Some embodiments of storage 225 store user device profiles 230, as described previously. Embodiments of user device profiles may include information about user device(s), such as information from user device monitor 280, device features identifier 290, or logical hubs determined to be associated with the particular user device such as determined by logical hub classifier 290. In one embodiment, a device profile 230 for a given device includes a) device features identified by device features identifier 290 for that device and/or b) logical hub(s) tagged to the device (or the logical hub(s) determined to be associated with the device; and may also include information about other user devices for the user that are associated with the same logical hub(s), or share the same logical hub tags. This information may be used for confirming or increasing the determined likelihood that a user is at a particular logical location. For example, where user activity across two user devices is detected and both devices are tagged as being associated with the user's home hub, then it may be determined that there is a higher probability that the user is logically located at her home hub.

In one embodiment, storage 225 stores one or more user profiles 240; an example embodiment of which is illustratively provided in FIG. 2. Example user profile 240 includes information associated with a particular user including, among other things, information about user devices and logical hubs associated with the user. As shown, user profile 240 includes data about a user's device(s) 242, data about the user logical hubs 244, user account(s) and activity data 246, and personalized content 229. The information stored in user profiles 240 may be available to the routines or other components of example system 200.

As described previously, data about a user's device(s) 242 includes information about user devices accessed, used, or otherwise associated with a particular user, which may be determined by user device monitor 280. In some embodiments, each of these devices of user's device(s) 242 has a corresponding user device profile 230. User logical hubs 244 generally includes information about logical hubs associated with the user, such as the user's logical home, logical office, logical gym, etc. In an embodiment, user logical hubs 244 may be determined based on the set of logical hubs determined to be associated with the user's devices, and may be used by logical inference engine 270 determining a logical location of the user.

User account(s) and activity data 246 generally includes user data collected from user-data collection component 210 (which in some cases may include crowdsourced data that is relevant to the particular user), and may be used for determining semantic knowledge about the user, which may be used for personalizing a user experience, user device features (such as by device features identifier 290), or logical locations of the user. In some embodiments, the information in user account(s) and activity data 246 is determined from user-data collection component 210, activity information extractor 284 or device monitor 280. In particular, user account(s) and activity data 246 may include data associated with user accounts, such as user accounts, online accounts (e.g. email, social media) such as a Microsoft® Net passport, user data relating to such accounts such as user emails, texts, instant messages, calls, and other communications; social network accounts and data, such as news feeds; online activity; and calendars, appointments, application data, or the like. Some embodiments of user account(s) and activity data 246 may store information across one or more databases, knowledge graphs, or data structures.

User preferences 248 generally include user settings regarding user preferences associated with specific logical hubs; for example, don't bother me with work notifications when I'm at home. Some preferences or settings may be explicitly provided by a user or inferred from user data or device features, as described previously. As described previously, personalized content 249 includes personalized content determined from content personalization engine 260, which may include pending notifications and information relevant to a user's logical hub location.

With reference now to FIG. 3, aspects of an example classification system for determining a logical hub associated with a user device are provided and referenced generally as system 300. In particular, example system 300 comprises classifier(s) 350, which may be embodied as logical hub classifier 250 as described in connection to system 200 of FIG. 2. Classifier(s) 350 uses a set of one or more device features 302, 304, 306, and 308, and global constraints 320 to determine one or more user device logical hubs 355 associated with a particular user device. The determined user device logical hubs 350 may be stored in a user device profile associated with the particular user device (such as user device profile 230 in system 200) in some embodiments.

Device features 302, 304, 306, and 308, which may be determined by device features identifier 290 or by analyzing user data, and may include information characterizing the user device, which may also include device usage information or related contextual information. As shown in example system 300, device features 302, 304, 306, and 308 comprise time related features, device characteristics features, usage related features, and complementary features, respectively. Although system 300 shows examples of these four categories of device features, it is contemplated that some embodiments of classifier(s) 350 may utilize any type of one or more user device features to determine a logical hub association. Additional details of device features 302, 304, 306, and 308 are described in connection to device features identifier 290 in system 200 (FIG. 2).

As described previously, global constraints 320 may include rules or conditions that assign weights to various device features including, for example, overriding rules. In some embodiments, global constraints 320, or other hub classification logic (not shown) utilized by classifier(s) 350 to determine logical hub association, may specify conditions for determining that a logical hub corresponds to a specific user device or associations between user device features and logical hubs. Global constraints 320 and hub classification logic are further described in connection to logical hub classifier 250 in system 200 (FIG. 2).

Figure 4:
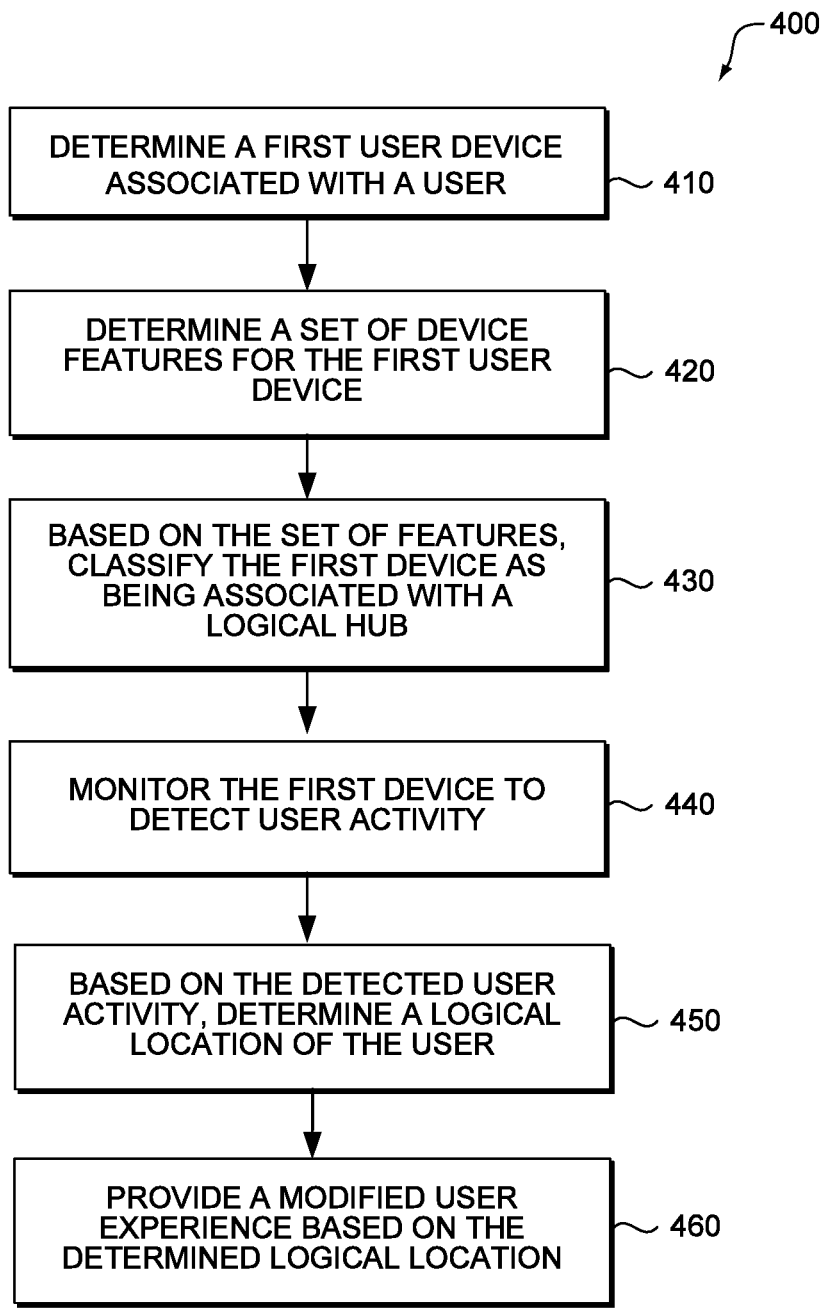
FIG. 4 depicts a flow diagram of a method for determining a logical hub associated of a user device, in accordance with an embodiment of the present disclosure.

Turning to FIG. 4, a flow diagram is provided illustrating one example method 400 for determining a logical hub associated with a user device. In some embodiments, method 400 further determines a location of a user based on a determined logical hub. Each block or step of method 400 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

At step 410, determine a first user device associated with a user. Embodiments of step 410 may determine a first user device based on monitoring user data for user-device related information. For example, as described previously, information about a user device may be sensed or otherwise detected from user data, such as my one or more sensors associated with a user device, or may be determined by detecting and analyzing user-device related information in user data to determine characteristics of the user device, such as device hardware, software such as operating system (OS), network-related characteristics, user accounts accessed via the device, and similar characteristics. In one embodiment, the detected user devices (such as user device 102a through 102n) may be polled, interrogated, or otherwise analyzed to determine information about the devices. In some implementations, this information may be used for determining a label or identification of the device (e.g. a device id) so that the user interaction with device may be recognized from user data such as in some embodiments of step 440. In some embodiments of step 410, a device may be determined based on user provided information, such as the case where a user declares or registers the device; for example, by logging into an account via the device, installing an application on the device, connecting to an online service that interrogates the device, or otherwise providing information about the device to an application or service.

Some implementations of step 410 may be carried out using a device identifier component or user device monitor component, such as described in system 200 of FIG. 2. Additional details of embodiments of step 410 are provided in connection with user device monitor 280 in FIG. 2.

At step 420, determine a set of device features for the first user device. In embodiments of step 420, a set of one or more device features are determined, which characterize the first user device and its usage. As described herein, in some embodiments, user-device related information (such as from user device monitor 290 or from user data, which may be provided by user-data collection component 210) is analyzed to determine a set of features associated with the user device. Examples of device features that characterize the user device, which are further described in connection to device features identifier 290, may include one or more of time related features; device characteristics (e.g. hardware, software, and network properties); usage related features, which may include pattern features; complementary features, which may include contextual information or external features; and information about the users who use the device, which may include information about the number of users, who use the device. In some embodiments, feature logic may be utilized to determine the set of features.

Some implementations of step 420 may be carried out using a device features identifier component, such as described in system 200 of FIG. 2. Additional details of embodiments of step 420 are provided in connection with user device features identifier 290 in FIG. 2.

At step 430, based on the set of device features determined in step 420, classify the first device as being associated with a logical hub. In embodiments of step 420, one or more of the device features that characterize the first user device may be utilized to determine a logical hub that is associated with the first user device. As described in system 200, a logical hub classifier may be used to classify the first user device as being associated with a logical hub. In some embodiments, the user devices are tagged or labeled as being associated with a particular hub.

Candidate logical hubs may be based on physical or logical locations that a particular user spends his or her time. In many instances, it can be assumed that most users have a home hub and an office hub. Different hubs can be determined by using device features including information indicating usage such as that certain user devices are typically used by the user at certain times of the day or week. Some embodiments of step 430 use hub classification logic to facilitate determining one or more logical hubs associated with the first user device. As described previously, hub classification logic may comprise rules, conditions, associations, and/or ordered processes for determining likely hub associations, such as analyzing specific features or the values associated with specific features. Further, in some embodiments, hub classification logic may include one or more global constraints, such as rules or conditions that assign weights to various device features; for example, overriding rules.

Some embodiments of step 430 use one or more statistical classifiers or probabilistic classifiers, such as trained classifiers or machine learning processes. In such embodiments, the device features and/or global constraints may be used as inputs to the classifier(s), with the output of the classifier including whether the device is associated with a particular logical hub or which logical hub(s) are associated with the device, and/or in some cases a likelihood of association with one or more logical hubs, depending on the specific classifier(s) employed. For example, in one embodiment a multinomial mixture model classifier is used. Embodiments of step 430 may be carried out using a logical hub classifier component in some embodiments, such as described in system 200 of FIG. 2. Additional details for embodiments of step 430 are provided in connection with logical hub classifier 250 in FIG. 2.

At step 440, the first device is monitored to detect user activity associated with the first device. In some embodiments of step 440, user data associated with the first user device is monitored to determine user activity associated with the device. User activity may be provided a user device monitor, such as user device monitor 280 of system 200 (FIG. 2) and/or from a user-data collection component, such as component 210 of system 200. In some embodiments, the detected user activity comprises usage-related device features. The user activity may comprise information about user interaction(s) with the device or other user activity related to the user device (for example accessing online settings associated with the device or remotely accessing the device). As described previously, in some embodiments, one or more sensors is utilized to detect the user activity, such sensors on the user device. Some embodiments of step 440 may be carried out by a user device monitor component or user-data collection component, such as described in system 200. Additional details for embodiments of step 440 are provided in connection with user device monitor 280 in FIG. 2.

At step 450, based on the detected user activity, a logical location is determined for the user. In embodiments, of step 450, a user's logical location may be inferred based on the logical hub(s) associated with the first user device; for example, the user may be determined to be logically located at one of the hub(s) associated with the first user device. Where a user device has only one associated logical hub, the user may be inferred to be logically located at that logical hub.

Some embodiments of step 450 perform an analysis on the detected user activity determined in step 440 to determine that the user is at a logical hub associated with the user device. For example, the analysis may determine that the detected user activity on the first device is due to the user and not another user. In some embodiments, the detected user activity comprises usage-related device features. The analysis of the user activity may also use used to resolve a particular logical hub location for the user in the case where the first user device is associated with more than one hub. For example, where the user's laptop is associated with his home and office hubs and current user activity is related to a streaming Netflix movie, because this activity alone is more consistent with device features associated with a home hub device, the user may be inferred to be logically located at his home hub.

Some embodiments of step 450 may be performed using a logical location inference engine component, such as described in connection to System 200 (FIG. 2). Additional details for determining a logical location for a user in step 440 are provided in connection with user device monitor 280 in FIG. 2.

At step 460, a modified user experience is provided to the user device based on the determined logical location of the user. The modified user experience may be provided via the first user device. In some embodiments of step 460, based on the logical location inference of the user determined in step 450, the user's computing experience is personalized. In some embodiments of step 450, content may be presented (or not presented) to the user on the first user device in a manner that is personalized, such as described in connection to content personalization engine 260 of System 200 (FIG. 2). For example, as described previously, if it is determined that the user's logical location is her logical office hub based on detected user activity indicating the user is using a laptop associated with the user's logical office hub, then content such as a work related notification for the user may be presented to the user via the laptop, but not presented via other user devices that may be signed into an account associated with the user but not associated with the user's logical office hub. Similarly, a reminder about paying the gym membership fee may be withheld from the user until it is determined that the user's logical location is at her logical gym hub, which may be determined based on detected user activity on a user device (such as a fitness tracker device) determined to be associated with the logical gym hub (such as described in step 430).

In some embodiments of step 460, personalized content may be provided to a service for presentation to a user. In particular, a service running on the first user device or in the cloud may modify user experience such as modifying or altering aspects of content for presentation to the user, thereby personalizing the user's experience. The modification of the content may be based on information in the content, such as content logic, other user data, and characteristics of the first user device.

For example, a cloud service may provide the aforementioned content to the service, which may be external to the cloud system comprising the cloud service. The service could be a third-party service and may be running on the first user device. More particularly, the service could be an application, such as a notification application, a scheduler or calendar application, a communication application, or another type of application, or app. The application may incorporate an API for communication with the cloud service. This may include requesting the data, and/or requesting one or more portions of the data. As an alternative to requesting, at least some of the data could be pushed to the application, for example, as unaddressed events are detected. The application may subscribe to receive these push messages. The API may further provide functions for interpreting the received data (e.g., the recommended actions and contextual information), and possibly for at least partially assisting the presentation of the personalized content.

Some embodiments of step 460 may utilize a content personalization engine component, such as described in connection to System 200 (FIG. 2). Additional details for determining a modified user experience in step 460 are provided in connection with content personalization engine 260 in FIG. 2.

Some embodiments of method 400 may further determine a second user device associated with the user (as described in step 410), a second set of features associated with the second user device (as described in step 420) and based on the second set of features, may classify the second user device as being associated with a second logical hub. In some instances, the second logical hub may be the same as the logical hub associated with the first user device (e.g. both user devices are associated with the logical home hub). To this end, multiple user device may be associated with the same logical hub. Moreover, in some instances, the first and second user devices may be physically located in different geographical locations, but may be determined to have the same logical hub. Thus, in some instances, a user that uses each device in each separate physical location may be determined to be at the same logical location, namely the logical location represented by shared logical hub associated with both of the user devices.

Some embodiments of method 400 for determining associated logical hubs or a logical location of a user do not utilize location information. Rather, the logical hub(s) and inferred logical locations may be determined using other non-location information such as other features of the user device. Examples of location information include information that provides an accurate location of the user, such as GPS, location information derived from Wi-Fi (e.g. based on a geographical location mapping of Wi-Fi networks) or similar geographical location information.

In some cases, a cloud system (such as the cloud system described above) and/or a cloud service may be utilized to perform method 400 so as to provide a personalized user experience (such as personalized content) to multiple services, which may be running on many different user devices. As such, system 200 can save significant processing, bandwidth, storage, and computing resources by centralizing certain functionality. For example, user-data collection component 210 (FIG. 2) can accumulate user data and interpretive data for multiple users or device-related data for multiple user devices, such that each user device does not require separate and redundant data collection and storage. Additionally, the processing and storage of user profile data can be made more secure by being disassociated from the user device, which is closely tied to the user.

Figure 5:
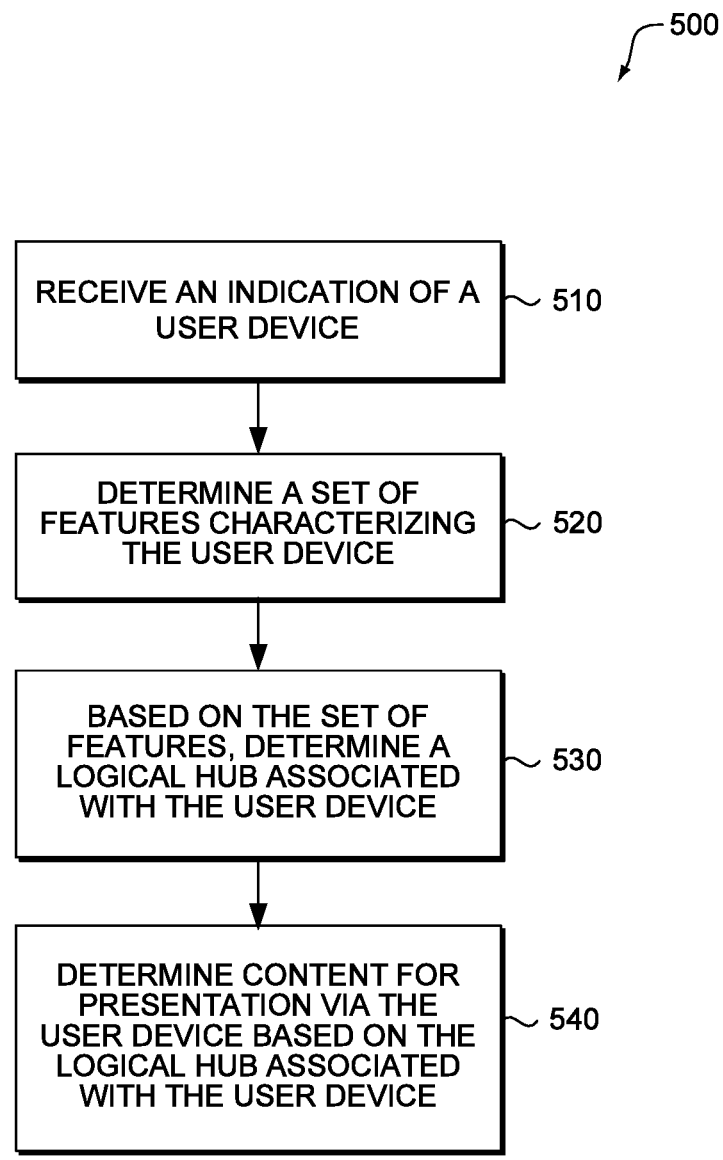
FIG. 5 depicts a flow diagram of a method for inferring a logical location of a user, in accordance with an embodiment of the present disclosure.

With reference now to FIG. 5, a flow diagram is provided illustrating one example method 500 for determining a logical hub associated of a user device. At step 510, an indication of a user device is received. The indication may provide information identifying a particular user device or information about a user device that may be used to identify a particular user device. In some embodiments of step 510, the indication may be received by an application or service, which may be running on the user device, on another computing device such as a server or other user device, or in the cloud. In some embodiments, the indication may be determined using a user device monitor or device identifier, such as described in System 200, which may identify the user device from user data, and provide an indication of the user device, such as a device name or device ID. Some embodiments of step 510 may be carried out using a user device monitor component or device features identifier component, such as described in System 200 of FIG. 2. Additional details of embodiments of step 510 are provided in connection with device features identifier 290 and user device monitor 280 in FIG. 2.

At step 520, a set of device features characterizing the user device are determined. In embodiments of step 520, a set of one or more device features are determined which characterize the user device, which may, in some embodiments, include features related to the usage of the device. Some embodiments of step 520 may be carried out as described in step 420 of method 400 (FIG. 4).

At step 530, based on the set of device features determined in step 520, determine a logical hub associated with the user device. In particular one or more of the device features, from the set of device features, may be analyzed to determine a logical hub association for the user device, such as described previously. In some embodiments of step 530, the set of device features are analyzed using hub classification logic. Further, some embodiments may utilize a logical hub classifier component, such as described in System 200. Additional details of determining logical hub association as in step 530 are provided in connection with logical hub classifier 250 in FIG. 2. Some embodiments of step 530 may be carried out as described in step 430 of method 400 (FIG. 4).

At step 540, determine content for presentation via the user device based on the logical hub associated with the user device. In embodiments of step 540, based on the logical hub determined in step 530, content for presentation via the user device is determined. In this way, content may be personalized for the user based on the logical hub associated with the user device. For example, content relating to a user's work, such as an email from the user's boss may be presented on a user device associated with the user' logical office hub, but not presented on a user device associated with the user's logical home hub.

As a further example, suppose the user is at home on a Friday night watching a movie over his home computer and using a streaming video application, such as Netflix. The user is watching the movie with his family; he has prepared popcorn, adjusted the lighting just right, and the movie is really good. Everyone in his family is having a good time watching the movie, and even the siblings are getting along. Then suddenly, on his home computer, the user gets a series of non-urgent instant messages from a work colleague about a project he is working on. The unwelcomed messages interrupt the movie, kill the mood, annoy the user, and probably upset the user's family. But under a different scenario, according to embodiments of the disclosure described herein, and in particular with regards to step 540, the instant messages may be determined to be presented on a user device associated with the user's logical office hub and not presented on the computer associated with his logical home hub that he is using to watch the movie. As a result, the home computer streaming the movie thus continues as if no instant messages were ever sent, the bandwidth that would otherwise be consumed by sending the instant messages to multiple user devices is conserved, and everyone is happier.

Some embodiments of step 540 may utilize a content personalization engine component, such as described in System 200. Additional details of determining content based on the associated logical hub in step 530 are provided in connection with content personalization engine 260 in FIG. 2. Further, some embodiments of step 540 may be carried out as described in step 460 of method 400 (FIG. 4).

Accordingly, we have described various aspects of technology directed to systems and methods for inferring logical locations of a user based on semantics of the user's computing devices and determining logical hub(s) associated with a user device, which may be used for providing a personalized user experience. It is understood that various features, sub-combinations, and modifications of the embodiments described herein are of utility and may be employed in other embodiments without reference to other features or sub-combinations. Moreover, the order and sequences of steps shown in the example methods 400 and 500 are not meant to limit the scope of the present disclosure in any way, and in fact, the steps may occur in a variety of different sequences within embodiments hereof Such variations and combinations thereof are also contemplated to be within the scope of embodiments of this disclosure.

Figure 6:
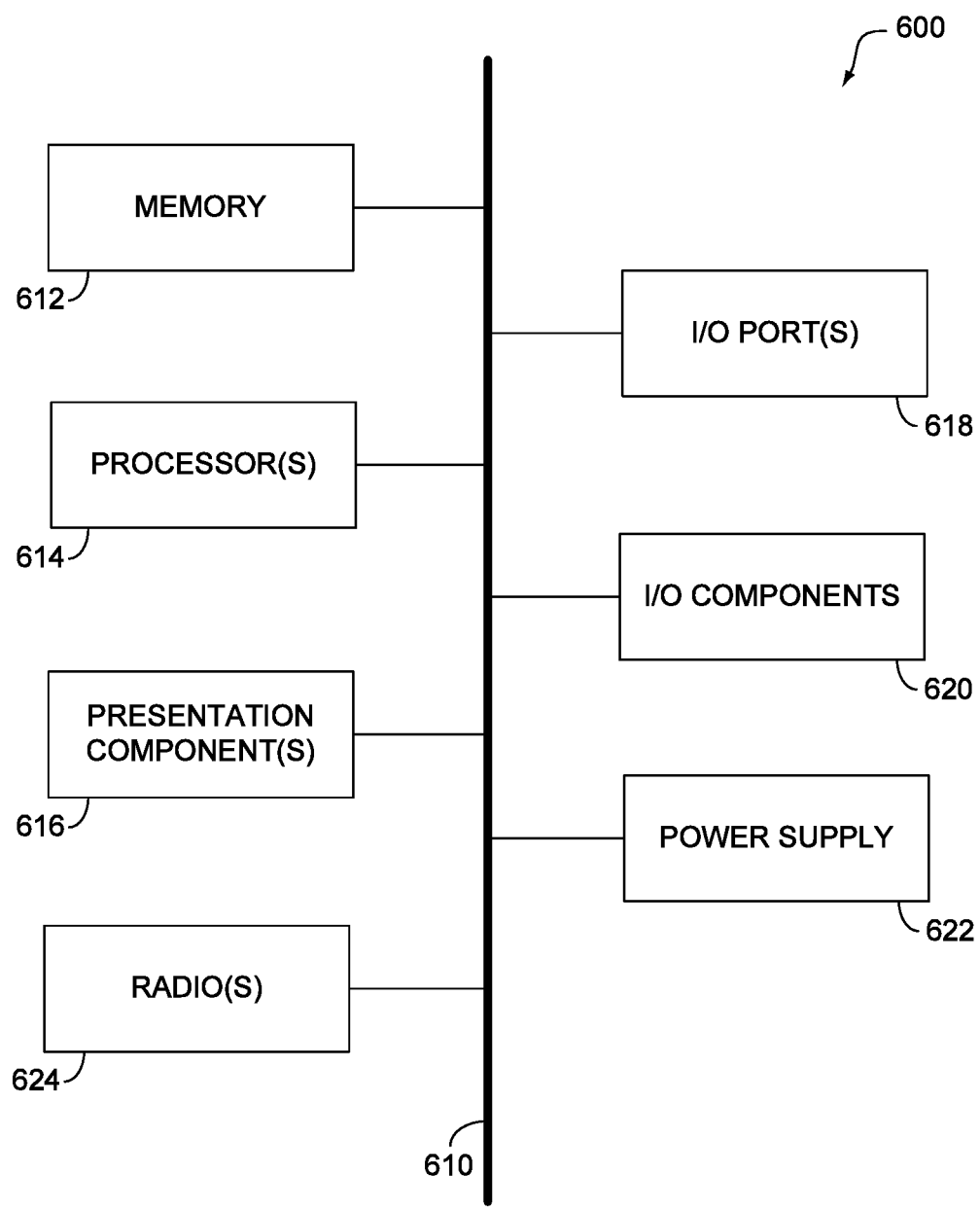
FIG. 6 is a block diagram of an exemplary computing environment suitable for use in implementing an embodiment of the present disclosure.

Having described various implementations, an exemplary computing environment suitable for implementing embodiments of the disclosure is now described. With reference to FIG. 6, an exemplary computing device is provided and referred to generally as computing device 600. The computing device 600 is but one example of a suitable computing environment and is not intended to suggest any limitation as to the scope of use or functionality of embodiments of the disclosure. Neither should the computing device 600 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 presents data indications to a user or other device. Exemplary presentation components include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some embodiments of computing device 600 may include one or more radio(s) 624 (or similar wireless communication components). The radio 624 transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and subcombinations and are contemplated within the scope of the claims.

Accordingly, in one aspect, an embodiment of the present disclosure is directed to a computerized system comprising one or more sensors configured to provide sensor data; a user device monitor configured to identify and monitor a user device and user activity associated with the user device; a device features identifier configured to identify features of a user device; one or more processors; and one or more computer storage media storing computer-useable instructions that, when used by the one or more processors, cause the one or more processors to perform operations. These operations include (a) determining, using the user device monitor, a first user device associated with a user; (b) determining, using the device features identifier, a first set of device features for the first user device, the first set of device features characterizing aspects of the first user device and determined based at least in part on the sensor data; (c) based on the first set of features, classifying the first user device as being associated with at least a first logical hub; (d) monitoring the first user device, using the user device monitor, to detect user activity associated with the first user device; and (e) based on the detected user activity, determining a logical location of the user.

In some embodiments of this system, these operations further include causing a modified user experience to be provided based on the determined logical location. In some cases, the modified user experience may comprise presenting, on the first user device, a content item that is related to the determined logical location of the user. In some cases, the modified user experience may comprise not presenting, on the first user device, a content item that is not related to the logical location of the user. Further, in some embodiments, the sensor data does not include geographical location information.

In another aspect, an embodiment of the present disclosure is directed to a computerized system comprising one or more sensors configured to provide sensor data; a device features identifier configured to determine device features of a user device; one or more processors; and one or more computer storage media storing computer-useable instructions that, when used by the one or more processors, cause the one or more processors to perform operations. These operations include (a) receiving an indication of a user device, the user device comprising a computing device associated with a user; determining, using the device features identifier, a set of device features characterizing aspects of the user device, the set of device features determined based at least in part on the sensor data; and based on the set of device features, determining a logical hub associated with the user device.

In some embodiments of this system, these operations further include determining content for presentation via the user device based on the determined logical hub associated with the user device. Further, in some embodiments of this system, these operations include monitoring the sensor data to determine user activity associated with the user device; and based on an analysis of the user activity and the determined logical hub, inferring a logical location of the user.

In yet another aspect, an embodiment of the disclosure is directed to a computerized method for providing a personalized user experience on a user device. The method includes (a) receiving an indication of a user device, the user device comprising a computing device having one or more sensors configured to provide sensor data regarding the user device; (b) determining a set of features characterizing aspects of the user device, the set of features determined based at least in part on the sensor data; (c) based on the set of features, determining a logical hub associated with the user device; and (d) determining content for presentation via the user device, the content determined based on the logical hub associated with the user device.

In some embodiments, the method further includes monitoring the sensor data to determine user activity associated with the user device; and based on an analysis of the user activity and the determined logical hub, inferring a logical location of the user. In some embodiments of the method, the sensor data does not include geographical location information of user device; the set of features includes usage pattern features determined from a pattern of user interactions with the user device; and/or the associated logical hub is determined using a statistical trained classifier.

What is claimed is:

1. A computerized system comprising:
   one or more sensors configured to collect user data;
   a user device monitor configured to identify and monitor a user device and user activity on the user device;
   a device features identifier configured to identify features of a user device;
   one or more processors; and
   one or more computer storage media storing computer-useable instructions that, when used by the one or more processors, cause the one or more processors to perform operations comprising:
   determining, using the user device monitor, a first user device associated with a user;
   determining, using the device features identifier, a first set of device features for the first user device, the first set of device features characterizing aspects of the first user device and determined based at least in part on the user data, wherein the first set of device features includes usage pattern features determined from a pattern of user interactions with the first user device;
   based on the first set of features, classifying the first user device as being associated with at least a first logical hub;
   monitoring the first user device, using the user device monitor, to detect user activity on the first user device; and
   based on the detected user activity on the first user device, determining a logical location of the user.

2. The computerized system of claim 1, wherein the user data comprises one or more of biometric data, motion data, time-related data, network-related data, and usage-related data.

3. The computerized system of claim 1, wherein the user data does not include geographical location information.

4. The computerized system of claim 1, wherein the first set of features for the first user device comprise one or more of time-related features, device characteristics, usage-related features, and complementary features, and wherein the at least a first logical hub comprises one or more of a home, office, gym, and school logical hub.

5. The computerized system of claim 1, wherein the logical location of the user is further determined based on an analysis of the detected user activity and the first logical hub.

6. The computerized system of claim 5, further comprising causing a modified user experience to be provided based on the determined logical location.

7. The computerized system of claim 6, wherein the modified user experience comprises presenting, on the first user device, a content item that is related to the determined logical location of the user.

8. The computerized system of claim 6, wherein the modified user experience comprises not presenting, on the first user device, a content item that is not related to the logical location of the user.

9. The computerized system of claim 1, further comprising:
determining, using the user device monitor, a second user device associated with a user;
determining, using the device features identifier, a second set of device features for the second user device, the second device features characterizing aspects of the second user device and determined based at least in part on the user data that does not include geographical location information of the second user device; and
based on the second set of features, classifying the second user device as being associated with a logical hub.

10. The computerized system of claim 9, wherein the first logical hub associated with the first user device and the logical hub associated with the second device are the same logical hub.

11. The computerized system of claim 10, wherein the first user device and the second user device are located at geographically distinct locations.

12. A computerized system comprising:
one or more sensors configured to provide sensor data;
a device features identifier configured to determine device features of a user device;
one or more processors; and
one or more computer storage media storing computer-useable instructions that, when used by the one or more processors, cause the one or more processors to perform operations comprising:
receiving an indication of a user device, the user device comprising a computing device associated with a user;
determining, using the device features identifier, a set of device features characterizing aspects of the user device, the set of device features determined based at least in part on the sensor data, wherein the set of features includes usage pattern features determined from a pattern of user interactions with the first user device; and
based on the set of device features, determining a logical hub associated with the user device.

13. The computerized system of claim 12, wherein the sensor data does not include geographical location information of the user device.

14. The computerized system of claim 12, further comprising determining content for presentation via the user device based on the determined logical hub associated with the user device.

15. The computerized system of claim 12, further comprising:
monitoring the sensor data to determine user activity associated with the user device; and
based on an analysis of the user activity and the determined logical hub, inferring a logical location of the user.

16. A computerized method for providing a personalized user experience on a user device, the method comprising:
receiving an indication of a first user device, the first user device associated with a user and comprising a computing device having one or more sensors configured to provide sensor data regarding the first user device;
determining a set of features characterizing aspects of the first user device, the set of features determined based at least in part on the sensor data, wherein the set of features includes usage pattern features determined from a pattern of user interactions with the first user device;
based on the set of features, determining a logical hub associated with the first user device; and
determining content for presentation via the first user device, the content determined based on the logical hub associated with the first user device.

17. The computerized method of claim 16, wherein the sensor data does not include geographical location information of the first user device.

18. The computerized method of claim 16, wherein determining the logical hub comprises:
providing the set of features as inputs to a statistical trained classifier; and
determining the logical hub based on the output of the statistical trained classifier.

19. The computerized method of claim 16, wherein the determined set of features include user-device features characterizing at least a second user device, the second user device associated with the same user as the first user device.

20. The computerized method of claim 16, further comprising:
monitoring the sensor data to determine user activity associated with the user device; and
based on an analysis of the user activity and the determined logical hub, inferring a logical location of the user.

* * * * *